(12) United States Patent
Steel et al.

(10) Patent No.: US 6,401,414 B1
(45) Date of Patent: Jun. 11, 2002

(54) WEATHER RESISTANT PANELS

(75) Inventors: Iain Steel, Chorleywood; Aldino Albertelli, London, both of (GB)

(73) Assignee: Acell Holdings Limited (GB)

( * ) Notice: Subject to any disclaimer, the term of this patent is extended or adjusted under 35 U.S.C. 154(b) by 0 days.

(21) Appl. No.: 09/611,512

(22) Filed: Jul. 7, 2000

Related U.S. Application Data

(63) Continuation of application No. PCT/GB99/00067, filed on Jan. 8, 1999.

(30) Foreign Application Priority Data

| Jan. 8, 1998 | (GB) | 9800371 |
| Apr. 16, 1998 | (GB) | 9808081 |
| May 11, 1998 | (GB) | 9810075 |

(51) Int. Cl.⁷ .................................................. E04C 1/00
(52) U.S. Cl. ............. 52/309.6; 52/309.9; 52/745.15; 52/784.15
(58) Field of Search ................. 52/309.9, 309.4, 52/784.14, 745.15, 309.6, 309.8, 784.15; 428/306.6, 308.4, 309.9, 319.3

(56) References Cited

U.S. PATENT DOCUMENTS 4,643,787 A  *  2/1987  Goodman .................. 156/196
RE36,240 E  *  6/1999  Minke et al. ................. 52/313

FOREIGN PATENT DOCUMENTS

| EP | 0010353 A1 * | 4/1980 | ............ 428/306.6 |
| EP | 0348033 A2 * | 12/1989 | ............ 428/306.6 |
| EP | 0635616 A1 | 7/1993 | |
| FR | 2578080 A1 | 2/1986 | |
| WO | WO99/35364 | 7/1999 | |

OTHER PUBLICATIONS

PCT Written Opinion (PCT Rule 66) International application No. PCT/GB99/00067 Applicant: Acell Holding Limited et al. International filing date Aug. 1, 1999; 6 pages.

* cited by examiner

*Primary Examiner*—Beth A. Stephan
*Assistant Examiner*—Naoko Slack
(74) *Attorney, Agent, or Firm*—Hodgson Russ LLP

(57) ABSTRACT

The use is described of rigid foam cores in panels, especially doors, of the kind comprising a foam core (22) between two molded skins (8,10). The weather-resistance, especially the resistance to thermally-induced bowing, of such panels is improved by forming the panel of at least one vacuum-formed thermoplastics skin (8,10) adhesively bonded to a substantially open-cell, rigid foam core (22). If the foam has frangible cell walls, it can be conformed to accommodate the depressed zones of a molded overlying door skin (8,10) by crumbling under compression, with fracture of the cell walls to accommodate the zones. A preferred open-cell rigid foam is a phenolic foam reinforced with finely divided particulate filler.

31 Claims, 15 Drawing Sheets

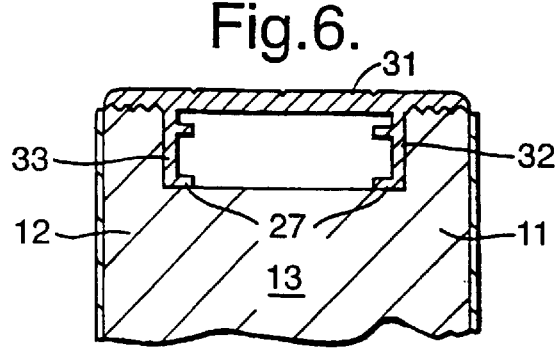
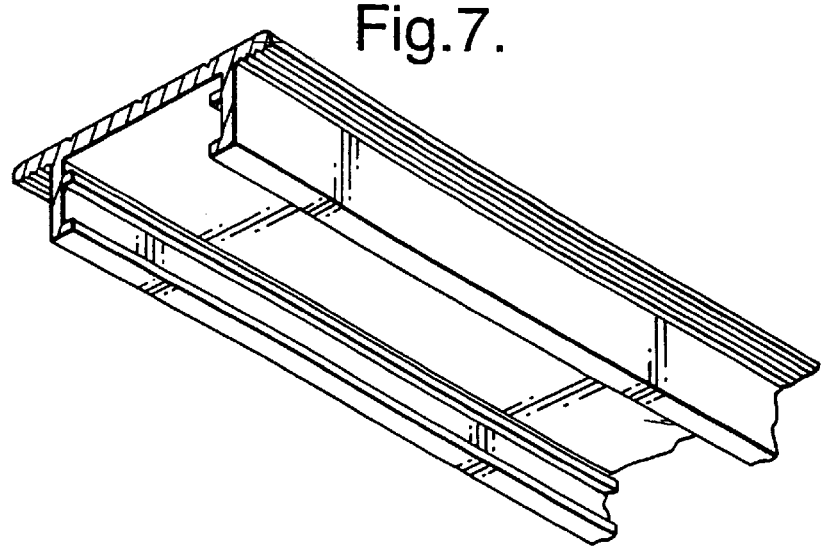
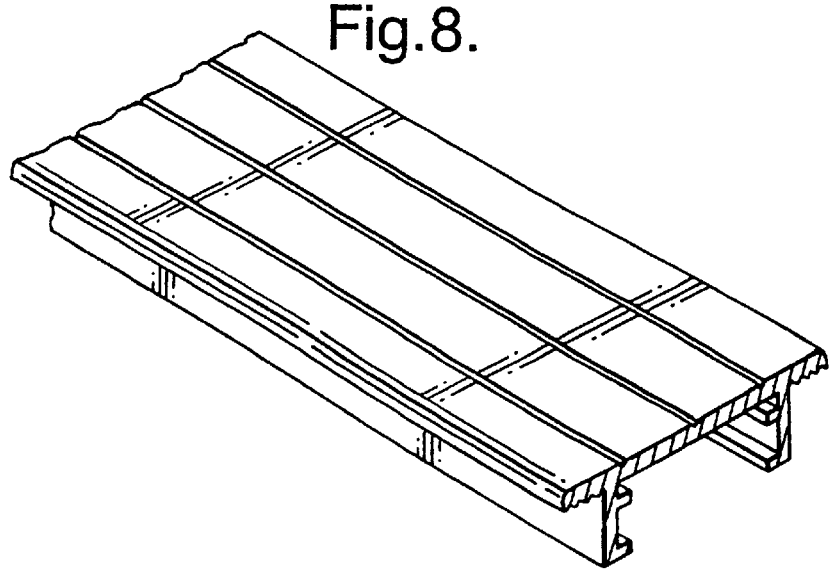

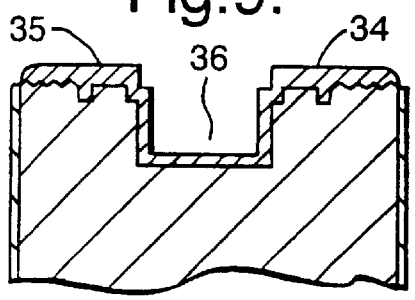
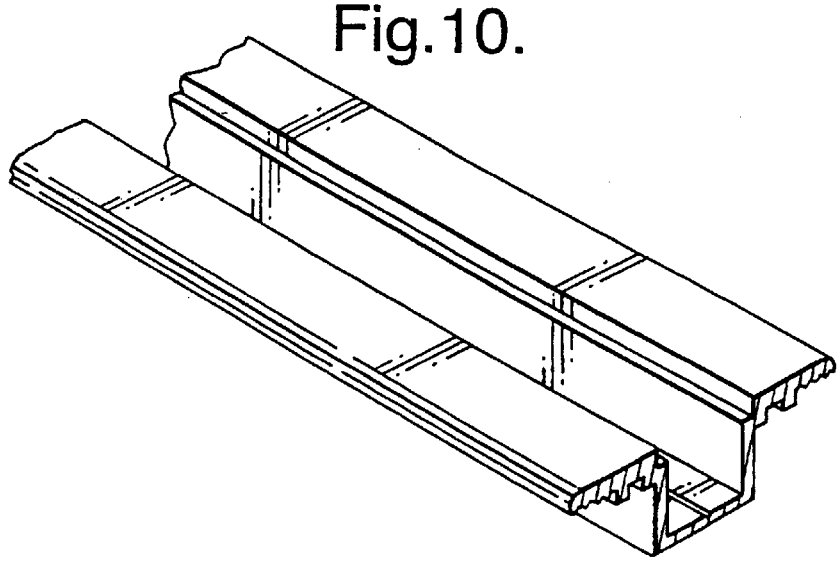
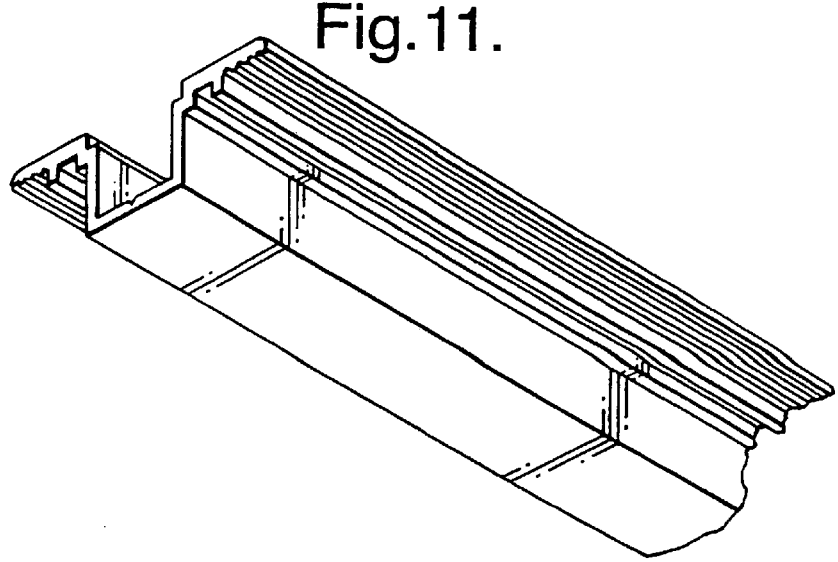

WEATHER RESISTANT PANELS

Applicants claim priority under 35 USC 119 based on Great Britain patent application nos. 9800371.8 filed Jan. 8, 1998, 9808081.5 filed Apr. 16, 1998, and 9810075.3 filed on May 11, 1998, and claim the benefit under 35 USC 120 based on International patent application no. PCT/GB99/00067 filed on Jan. 8, 1999, as continuation application.

The present invention relates to weather resistant panels. In particular, the present invention relates to weather resistant doors and most particularly temperature resistant doors. For ease of reference the term "panel" when used herein shall include "door". Whilst the invention will be described with particular reference to the panel being a door, it is also applicable to other panels such as, for example, false walls, wall facias, office dividers and the like.

By "weather resistant" we mean that the panel is resistant to damage caused by climatic features such as temperature and humidity. In particular we mean damage that is caused by changes in climatic features and in particular changes in temperature. In addition, we mean damage that is caused when opposed faces of the panel are exposed to different climatic features in particular different temperatures.

Where the panel is, for example, an exterior door, the external face of the door may be exposed to high temperatures during the summer months whilst the internal face of the door is exposed to cool temperatures caused by, for example, air conditioning. In contrast, in the winter months the outer face of the door is exposed to cold temperatures whilst the inner face is exposed to warmer temperatures due to heating inside the building. The door will also be exposed to different temperatures during a 24-hour period as the ambient temperatures change or as a result of being exposed to direct sunlight and then in shade. Even where the panel is for use internally, the panel may be exposed to different temperatures during a period as heating is switched on and off, is altered over time or differs between rooms.

Damage to the panel caused by these differences in temperature and/or humidity includes crack failure on the surface of the panel, the development of curvature, known as "bowing" or other distortion of the entire surface of the panel. Distortion of a panel, such as a door, may have several severe consequences. First the appearance of the door may be marred. Secondly, the ease of the operation of the door may be affected, in particular it may become difficult to open or shut the door.

Most seriously, the air-tightness, water-tightness and sound insulation of the door may be reduced.

It is therefore desirable to provide "weather resistant" panels which are able to withstand these changes in temperature and/or humidity and which therefore have a longer useful life. Further it is advantageous if the panel exhibits an ability to insulate the face of the panel remote from a heat source from the heat. That is to say the panel reduces the transmission of heat through the panel.

Panels which are resistant to the transmission of heat have various applications. Heat resistant panels are desirable for use in domestic, industrial and commercial buildings and are required in buildings that have multiple occupancy such as hospitals, residential homes, offices and the like. These panels may be for internal or external use. Many countries set minimum safety requirements which building materials must meet before they can be used in the aforementioned situations. The ability of the panels to not only retard heat transmission but also to withstand changes in ambient temperature is particularly advantageous as the frequency at which panels have to be replaced is reduced.

Panels may be made from a variety of materials. Historically, wood has been the material of choice, either used alone or glazed to allow visibility through the panel. However, wooden panels can suffer from warping and splitting when subjected to changes in temperature. In recent years it has been desirable to replace wood as the preferred material with plastics materials which are generally cheaper and easier to handle than wood.

Panels formed from plastics material often comprise a pair of vacuum formed thermoplastics skins, attached to opposed faces of a frame, eg of wood and having a core of a filler material which may be, for example, glass fibre, foamed plastics or the like. Panels of this type are difficult to manufacture and do not overcome the disadvantages of wooden panels with regard to temperature resistance. Indeed for some plastics materials the damage caused by changes in ambient temperature can be greater than for panels made from wood. In particular, panels formed from plastic materials tend to suffer from bowing when exposed to increased temperature on one side of the panel. This is believed to be due to the different levels of expansion of the plastics skins on the "hot" and "cold" sides of the panel. Since the skins are bonded at their edges to the frame, the only way in which the different levels of thermal expansion of the skins can be absorbed is by bowing.

Further, it has been difficult to obtain panels formed from plastics material which meet the heat resistant criteria set down by the legislative bodies.

We have now discovered that the above-mentioned disadvantages can be overcome and that a panel having a vacuum formed thermoplastics skin can be formed which exhibits improved resistance to bowing and which exhibits substantial heat resistance.

Thus, according to a first aspect of the present invention there is provided a panel comprising a substantially open-cell, rigid foam core and at least one vacuum formed thermoplastic skin adhesively bonded to said foam core. The at least one skin preferably comprises vinyl chloride polymer such as PVC or, more preferably uPVC. The panel preferably comprises two skins adhesively bonded to opposing faces of the panel. More preferably the panel also includes a frame or frame members which are suitably of wood.

Without wishing to be bound by any theory, it is believed that when the opposed faces of a panel according to the invention are exposed to different temperatures, the rigidity of the core, to which the heated skin is adhesively bonded, provides a counter force to the thermal effect on the skin and inhibits the skin from expanding. It is further believed that the substantial stress which would be created in the skin due to the inability to expand fully is possibly absorbed, at least to some extent, by material flow within the skin. In any event, whether or not this theory is correct, it has been found that when the skin of the panel is exposed to changes in temperature and/or humidity, cracking, bowing and other damage caused by exposure to heat are substantially reduced over what been achieved heretofore. Further the transmission of heat through the panel is also reduced.

The foam core preferably has at least one face containing pores which when the, or each, skin is in place are open to the rear face of the skin. In this arrangement, the adhesive can percolate into and key to the surface of the foam, thereby forming a stronger bond. This serves to lock the skin to the foam.

Where a panel is faced with vacuum formed plastics skins, it is difficult to provide them with the depressed zones of moulding detail which are found in traditional panelled wooden panels. This is because in order to achieve the depressed zones it would be necessary either to use preformed foamed core parts of complicated shape or to leave space behind the depressed zones empty. Both methods are disadvantageous. The first is costly and the second results in a panel having zones of weakness and an unacceptable lack of rigidity. One method of overcoming this problem is to provide the moulding detail as raised portions in the skin. However, these are not as aesthetically pleasing as the preferred depressions and further, if these are hollow, the air inside the raised portions expands when the panel is exposed to increased temperatures and the mouldings may burst.

Therefore, according to a second aspect of the present invention there is provided a moulded panel comprising at least one vacuum formed skin, having depressed zones adhesively bonded to a foamed plastics core wherein the core comprises a substantially rigid plastics foam having frangible cell walls.

By a foam having frangible cell walls we mean that under compression the foam crumbles by brittle fracture of the cell walls e.g. involving a clean fracture of the cell walls. In one aspect of the invention, such foams retain a clear and substantially dimensionally accurate imprint in the crushed zone of the object through which the compressive force is applied. In general, it is preferred that the yield strength of the foam, which in this case means the minimum force required to cause the fracture of the cell walls and for the foam to crumble, is in the range of about 100 to 140 KPa (15 to 20 lbs/sq.in) more preferably at least 200 KPa (30 lbs/sq.in), since this provides the panel with useful impact resistance. In general, for a given foam composition, the greater the density, the greater the yield strength.

By using a substantially rigid plastics foam with frangible cell walls, mouldings with depressed zones of moulding detail can be readily formed by applying the vacuum formed skin to the foam core with sufficient pressure to cause the cell walls of the foam in the areas behind the depressed zones of the skin to be fractured whereby the foam is caused to conform to the contours of the skin in those zones by controlled localised crushing. Thus, air gaps between the skins can be avoided and it is not necessary to preform the core pieces in the form of complicated shapes. This is particularly advantageous since the presence of such air gaps in prior art panels has contributed to their inability to resist changes in temperature.

It is advantageous to use an open cell foam having frangible walls as pressing a skin having depressed regions into a conventional foamed core such as of polystyrene cannot be successfully achieved because the resilience of the foam will cause distortion of the skins when the pressure is released.

Any suitable plastics foam may be used provided it is substantially open-cell and rigid. However, the foam is advantageously selected to be of a high density relative to the foamed polystyrene conventionally used, e.g. a density of 75 kg/m$^3$ or above, since this gives a better feel to the panel and makes it sound and handle more like a conventional wooden panel. However, foams having lower densities may also be selected. Where a higher density is desirable, the foam may contain a filler, more preferably a finely divided inert and preferably inorganic solid. The filler may be selected such that it contributes to the panels ability to resist changes in temperature. In a particularly preferred embodiment, the filler is capable of absorbing moisture, e.g. as water of crystallisation.

It is believed that in prior arrangements where a closed cell foam is employed, such as a polystyrene foam, any solvent employed or moisture present during the bonding of the foam core to the skin tends to be trapped between the core and the skin. Any volatilisation and subsequent condensation of the solvent or moisture due to localised changes in temperature, for example as a result of exposure to strong sunlight and then darkness, cause high localised pressure variations which tend to lead to localised bubbling, or failure of the bond. The effect is even more marked where high temperatures are encountered. A closed cell foam may even contribute to the "bowing" because any air or solvent trapped in the core itself will expand when the core is heated causing the panel to bow.

Without wishing to be bound by any theory, it is believed that the reduction of bowing is assisted by use of an open cell foam in the core since gas flow is possible which reduces the localised increases in pressure. As the foam is of an open cell configuration, as the gases in cells closest to the heat source expand they flow through open pathways to adjacent cells and by this means pressure is dissipated through the panel. Further, the open cell configuration reduces the rate at which heat is passed through the panel.

Thus according to a further aspect of the present invention there is provided the use of an open cell foam as a core for a panel having at least one vacuum formed skin to improve the weather resistance of the panel.

Any suitable foam may be used for this aspect of the invention provided it is substantially open cell. A foam that has an open-cell configuration at production is particularly suitable but a foam which also has frangible cell walls is particularly preferred where the skin includes depressed areas, such as to provide a moulding effect. Where a foam of this type is used, the cell wall will fracture as pressure is placed on the foam by the application of the depressed areas of the skin. This localised increase in pressure will increase the pressure inside the cell which will cause the gases to travel through the foam and the cell to collapse thereby accommodating the depressed area of the skin.

One suitable foam is a rigid filled phenolic foam. One particularly suitable foam is that produced by effecting a curing reaction between:

(a) a liquid phenolic resole having a reactivity number (as defined below) of at least 1 and (b) a strong acid hardener for the resole, in the presence of:

(c) a finely divided inert and insoluble particulate solid which is present in an amount of at least 5 % by weight of the liquid resole and is substantially uniformly dispersed through the mixture containing resole and hardener; the temperature of the mixture containing resole and hardener due to applied heat not exceeding 85° C. and the said temperature and the concentration of the acid hardener being such that compounds generated as by-products of the curing reaction are volatilised within the mixture before the mixture sets whereby a foamed phenolic resin product is produced.

By a phenolic resole is meant a solution in a suitable solvent of the acid-curable prepolymer composition obtained by condensing, usually in the presence of an alkaline catalyst such as sodium hydroxide, at least one phenolic compound with at least one aldehyde, in well-known manner. Examples of phenols that may be employed are phenol itself and substituted, usually alkyl substituted, derivatives thereof provided that the three positions on the phenolic benzene ring o- and p- to the phenolic hydroxyl group are unsubstituted. Mixtures of such phenols may also be used. Mixtures of one or more than one of such phenols with substituted phenols in which one of the ortho or para positions has been substituted may also be employed where an improvement in the flow characteristics of the resole is required but the cured products will be less highly cross-linked. However, in general, the phenol will be comprised mainly or entirely of phenol itself, for economic reasons.

The aldehyde will generally be formaldehyde although the use of higher molecular weight aldehydes is not excluded.

The phenol/aldehyde condensation product component of the resole is suitably formed by reaction of the phenol with at least 1 mole of formaldehyde per mole of the phenol, the formaldehyde being generally provided as a solution in water, e.g. as formalin. It is preferred to use a molar ratio of formaldehyde to phenol of at least 1.25 to 1 but ratios above 2.5 to 1 are preferably avoided. The most preferred range is 1.4–2.0 to 1.

The mixture may also contain a compound having two active H atoms (dihydric compound) which will react with the phenol/aldehyde reaction product of the resole during the curing step to reduce the density of cross-linking. Preferred dihydric compounds are diols, especially alkylene diols or diols in which the chain of atoms between the OH groups contains not only methylene and/or alkyl-substituted methylene groups but also one or more hetero atoms, especially oxygen atoms, e.g. ethylene glycol, propylene glycol, propane-1,3-diol, butane-1,4-diol and neopentyl glycol. Particularly preferred diols are poly-, especially di-, (alkylene ether) diols e.g. diethylene glycol and, especially, dipropylene glycol. Preferably the dihydric compound is present in an amount of from 0 to 35% by weight, more preferably 0 to 25% by weight, based on the weight of phenol/aldehyde condensation product. Most preferably, the dihydric compound, when used, is present in an amount of from 5 to 15% by weight based on the weight of phenol/aldehyde condensation product. When such resoles containing dihydric compounds are employed in the present process, products having a particularly good combination of physical properties, especially strength, can be obtained.

Suitably, the dihydric compound is added to the formed resole and preferably has 2–6 atoms between OH groups.

The resole may comprise a solution of the phenol/aldehyde reaction product in water or in any other suitable solvent or in a solvent mixture which may or may not include water. Where water is used as the sole solvent, it is preferred to be present in an amount of from 15 to 35% by weight of the resole, preferably 20 to 30%. Of course the water content may be substantially less if it is used in conjunction with a co-solvent. e.g. an alcohol or one of the above-mentioned dihydric compounds where one is used.

As indicated above, the liquid resole (i.e. the solution of phenol/aldehyde product optionally containing dihydric compound) must have a reactivity number of at least 1. The reactivity number is 10/x where x is the time in minutes required to harden the resole using 10% by weight of the resole of a 66–67% aqueous solution of p-toluene sulfonic acid at 60° C. The test involves mixing about 5 ml of the resole with the stated amount of the p-toluene sulfonic acid solution in a test tube, immersing the test tube in a water bath heated to 60° C. and measuring the time required for the mixture to become hard to the touch. The resole should have a reactivity number of at least 1 for useful foamed products to be produced and preferably the resole has a reactivity number of at least 5, most preferably at least 10.

The pH of the resole, which is generally alkaline, is preferably adjusted to about 7, if necessary, for use in the process, suitably by the addition of a weak organic acid such as lactic acid.

Examples of strong acid hardeners are inorganic acids such as hydrochloric acid, sulphuric acid and phosphoric acid, and strong organic acids such as aromatic sulphonic acids, e.g. toluene sulphonic acids, and trichloroacetic acid. Weak acids such as acetic acid and propionic acid are generally not suitable. The preferred hardeners for the process of the invention are the aromatic sulfonic acids, especially toluene sulfonic acids.

The acid may be used as a solution in a suitable solvent such as water.

When the mixture of resole, hardener and solid is to be poured, e.g. into a mould and in slush moulding applications, the amount of inert solid that can be added to the resole and hardener is determined by the viscosity of the mixture of resole and hardener in the absence of the solid. For these applications, it is preferred that the hardener is provided in a form, e.g. solution, such that when mixed with the resole in the required amount yields a liquid having an apparent viscosity not exceeding about 50 poises at the temperature at which the mixture is to be used, and the preferred range is 5–20 poises. Below 5 Poises, the amount of solvent present tends to present difficulties during the curing reaction.

The curing reaction is exothermic and will therefore of itself cause the temperature of the mixture containing resole and acid hardener to be raised. The temperature of the mixture may also be raised by applied heat but the temperature to which said mixture may then be raised (that is, excluding the effect of any exotherm) must not exceed 85° C.

If the temperature of the mixture exceeds 85° C. before addition of the hardener, it is difficult or impossible thereafter to properly disperse the hardener through the mixture because of incipient curing. On the other hand, it is difficult, if not impossible, to uniformly heat the mixture above 85° C. after addition of the hardener.

Increasing the temperature towards 85° C. tends to lead to coarseness and non-uniformity of the texture of the foam but this can be offset at least to some extent at moderate temperatures by reducing the concentration of hardener. However at temperatures much above 75° C. even the minimum amount of hardener required to cause the composition to set is generally too much to avoid these disadvantages. Thus, temperatures above 75° C. are preferably avoided and preferred temperatures for most applications are from ambient temperature to about 75° C. The preferred temperature range appears to depend to some extent on the nature of the solid (c). For most solids it is from 25 to 65° C. but for some solids, in particular wood flour and grain flour, the preferred range is 25 to 75° C. The most preferred temperature range is 30 to 50° C. Temperatures below ambient, e.g. down to 10° C. can be used, if desired, but no advantage is gained thereby. In general, at temperatures up to 75° C., increase in temperature leads to decrease in the density of the foam and vice versa.

The amount of hardener present also affects the nature of the product as well as the rate of hardening. Thus, increasing the amount of hardener not only has the effect of reducing the time required to harden the composition but above a certain level dependant on the temperature and nature of the resole it also tends to produce a less uniform cell structure. It also tends to increase the density of the foam because of the increase in the rate of hardening. In fact, if too high a concentration of hardener is used, the rate of hardening may be so rapid that no foaming occurs at all and under some conditions the reaction can become explosive because of the build up of gas inside a hardened shell of resin. The appropriate amount of hardener will depend primarily on the temperature of the mixture of resole and hardener prior to the commencement of the exothermic curing reaction and the reactivity number of the resole and will vary inversely with the chosen temperature and the reactivity number. The preferred range of hardener concentration is the equivalent of 2 to 20 parts by weight of p-toluene sulfonic acid per 100 parts by weight of phenol/aldehyde reaction product in the resole assuming that the resole has a substantially neutral reaction, i.e. a pH of about 7. By equivalent to p-toluene sulfonic acid, we mean the amount of chosen hardener required to give substantially the same setting time as the stated amount of p-toluene sulfonic acid. The most suitable amount for any given temperature and combination of resole and finely divided solid is readily determinable by simple experiment. Where the preferred temperature range is 25–75° C. and the resole has a reactivity number of at least 10, the best results are generally obtained with the use of hardener in amounts equivalent to 3 to 10 parts of p-toluene sulfonic acid per 100 parts by weight of the phenol/aldehyde reaction product. For use with temperatures below 25° C. or resoles having a reactivity number below 10, it may be necessary to use more hardener.

It may be necessary to make some adjustment of the hardener composition in accordance with the nature, especially shape and size, of the mould and this can be established by experiment.

By suitable control of the temperature and of the hardener concentration, the time lapse between adding the hardener to the resole and the composition becoming hard (referred to herein as the setting time) can be varied at will from a few seconds to up to an hour or even more, without substantially affecting the density and cell structure of the product.

Another factor which controls the amount of hardener required can be the nature of the inert solid. Very few are exactly neutral and if the solid has an alkaline reaction, even if only very slight, more hardener may be required because of the tendency of the filler to neutralize it. It is therefore to be understood that the preferred values for hardener concentration given above do not take into account any such effect of the solid. Any adjustment required because of the nature of the solid will depend on the amount of solid used and can be determined by simple experiment.

The exothermic curing reaction of the resole and acid hardener leads to the formation of by-products, particularly aldehyde and water which are at least partially volatilised.

The curing reaction is effected in the presence of a finely divided inert and insoluble particulate solid which is substantially uniformly dispersed throughout the mixture of resole and hardener. By an inert solid we mean that in the quantity it is used it does not prevent the curing reaction.

It is believed that the finely divided particulate solid provides nuclei for the gas bubbles formed by the volatilisation of the small molecules, primarily $CH_2O$ and/or $H_2O$, present in the resole and/or generated by the curing action, and provides sites at which bubble formation is promoted, thereby assisting uniformity of pore size. The presence of the finely divided solid may also promote stabilization of the individual bubbles and reduce the tendency of bubbles to agglomerate and eventually cause likelihood of bubble collapse prior to cure. The phenomenon may be similar to that of froth flotation employed in the concentration of low grade ores in metallurgy. In any event, the presence of the solid is essential to the formation of the product. To achieve the desired effect, the solid should be present in an amount of not less than 5% by weight based on the weight of the resole.

Any finely divided particulate solid which is insoluble in the reaction mixture is suitable, provided it is inert. The fillers may be organic or inorganic (including metallic), and crystalline or amorphous. Even fibrous solids have been found to be effective, although not preferred. Examples include clays, clay minerals, talc, vermiculite, metal oxides, refractories, solid or hollow glass microspheres, fly ash, coal dust, wood flour, grain flour, nut shell flour, silica, mineral fibres such as finely chopped glass fibre and finely divided asbestos, chopped fibres, finely chopped natural or synthetic fibres, ground plastics and resins whether in the form of powder or fibres, e.g. reclaimed waste plastics and resins, pigments such as powdered paint and carbon black, and starches.

Solids having more than a slightly alkaline reaction, e.g. silicates and carbonates of alkali metals, are preferably avoided because of their tendency to react with the acid hardener. Solids such as talc, however, which have a very mild alkaline reaction, in some cases because of contamination with more strongly alkaline materials such as magnesite, are acceptable.

Some materials, especially fibrous materials such as wood flour, can be absorbent and it may therefore be necessary to use generally larger amounts of these materials than non-fibrous materials, to achieve valuable foamed products.

The solids preferably have a particle size in the range 0.5 to 800 microns. If the particle size is too great, the cell structure of the foam tends to become undesirably coarse. On the other hand, at very small particle sizes, the foams obtained tend to be rather dense. The preferred range is 1 to 100 microns, most preferably 2 to 40 microns. Uniformity of cell structure appears to be encouraged by uniformity of particle size. Mixtures of solids may be used if desired.

If desired, solids such as finely divided metal powders may be included which contribute to the volume of gas or vapour generated during the process. If used alone, however, it be understood that the residues they leave after the gas by decomposition or chemical reaction satisfy the requirements of the inert and insoluble finely divided particulate solid required by the process of the invention.

Preferably, the finely divided solid has a density which is not greatly different from that of the resole, so as to reduce the possibility of the finely divided solid tending to accumulate towards the bottom of the mixture after mixing.

One preferred class of solids is the hydraulic cements, e.g. gypsum and plaster, but not Portland cement because of its alkalinity. These solids will tend to react with water present in the reaction mixture to produce a hardened skeletal structure within the cured resin product. Moreover, the reaction with the water is also exothermic and assists in the foaming and curing reaction. Foamed products obtained using these materials have particularly valuable physical properties. Moreover, when exposed to flame even for long periods of time they tend to char to a brick-like consistency which is still strong and capable of supporting loads. The products also have excellent thermal insulation and energy absorption properties. The preferred amount of inert particulate solid is from 20 to 200 parts by weight per 100 parts by weight of resole.

Another class of solids which is preferred because its use yields products having properties similar to those obtained using hydraulic cements comprises talc and fly ash. The preferred amounts of these solids are also 20 to 200 parts by weight per 100 parts by weight of resole.

For the above classes of solid, the most preferred range is 50 to 150 parts per 100 parts of resole.

Thixotropic foam-forming mixtures can be obtained if a very finely divided solid such as Aerosil (finely divided silica) is included.

If a finely divided metal powder is included, electrically conducting properties can be obtained. The metal powder is preferably used in amounts of from 50 to 250 parts per 100 parts by weight of resole.

In general, the maximum amount of solid that can be employed is controlled only by the physical problem of incorporating it into the mixture and handling the mixture.

In general it is desired that the mixture is pourable but even at quite high solids concentrations, when the mixture is like a dough or paste and cannot be poured, foamed products with valuable properties can be obtained.

In general, it is preferred to use the fibrous solids only in conjunction with a non-fibrous solid since otherwise the foam texture tends to be poorer.

Other additives may be included in the foam-forming mixture; e.g. surfactants, such as anionic materials e.g. sodium salts of long chain alkyl benzene sulfonic acids, non-ionic materials such as those based on poly(ethylene oxide) or copolymers thereof, and cationic materials such as long chain quaternary ammonium compounds or those based on polyacrylamides; viscosity modifiers such as alkyl cellulose especially methyl cellulose, and colorants such as dyes or pigments. Plasticisers for phenolic resins may also be included provided the curing and foaming reactions are not suppressed thereby, and polyfunctional compounds other than the dihydric compounds referred to above may be included which take part in the cross-linking reaction which occurs in curing; e.g. di- or poly-amines, di- or poly-isocyanates, di- or poly-carboxylic acids and aminoalcohols.

Polymerisable unsaturated compounds may also be included possibly together with free-radical polymerisation initiators that are activated during the curing action e.g. acrylic monomers, so-called urethane acrylates, styrene, maleic acid and derivatives thereof, and mixtures thereof.

Other resins may be included e.g. as prepolymers which are cured during the foaming and curing reaction or as powders, emulsions or dispersions. Examples are polyacetals such as polyvinyl acetals, vinyl polymers, olefin polymers, polyesters, acrylic polymers and styrene polymers, polyurethanes and prepolymers thereof and polyester prepolymers, as well as melamine resins, phenolic novolaks, etc.

Conventional blowing agents may also be included to enhance the foaming reaction, e.g. low boiling organic compounds or compounds which decompose or react to produce gases.

The foam-forming compositions may also contain dehydrators, if desired.

A preferred method of forming the foam-forming composition comprises first mixture the resole and inert filler to obtain a substantially uniform dispersion of the filler in the resole, and thereafter adding the hardener. Uniform distribution of both the filler and the hardener throughout the composition is essential for the production of uniformly textured foam products and therefore thorough mixing is required.

If it is desired that the composition is at elevated temperature prior to commencement of the exothermic reaction, this can be achieved by heating the resole or first mixing the resole and the solid and then heating the mixture. Preferably the solid is added to the resole just before the addition of the hardener. Alternatively, the mixture of resole, solid and hardener may be prepared and the whole mixture then heated, e.g. by short wave irradiation, preferably after it has been charged to a mould. A conventional radiant heat oven may also be used, if desired, but it is difficult to achieve uniform heating of the mixture by this means.

Preferably, the foam has a density in the range 75 to 500 kg/m$^3$ more preferably 100 to 400 kg/m$^3$ and most preferably 100 to 250 kg/m$^3$. Foam cell size is also important because up to a limit the larger the size of the cell for a given density, the thicker will be the walls and hence the greater the physical strength of the foam. However if the cell size is too large, the strength begins to suffer. Preferably, the cell size is in the range of 1 to 3 mm.

Any suitable thermoplastic material may be employed to form the skins of the panels provided it is capable of being produced as a sheet which is vacuum formable. For reasons of cost, the skins are preferably formed of a vinyl chloride polymer such as PVC, more preferably u-PVC, since this is the material conventionally used; however other plastics materials such as acrylics, ABS and polymer blends may also be used.

Any suitable adhesive may be used for bonding the skins to the foam core, including moisture-curing polyurethanes, two-pack polyurethanes, solvent based adhesives and, preferably, unsaturated polyester-based adhesives. Provided an open-cell foam is employed, excess solvent or moisture is not a problem as it can be absorbed into the foam.

To give improved rigidity, in general the panel skins will be spaced not only by a foam core but also by a frame or frame members such as stiles, rails, and/or mullions. The frame members may be of wood, metal or plastics or a combination of these, e.g. metal-reinforced plastics. The plastics material may contain filler, if desired, to improve hardness and/or rigidity.

In a preferred embodiment, the foam core occupies substantially the entire volume or volumes within the frame; i.e. substantially the whole space within the panel defined by the skins and the components of the frame. It is also preferred that the foam is bonded to each skin over substantially the entire area of the foam core which is in contact with that skin, even when the skin includes one or more depressed zones, since this enhances the overall strength of the panel and the resistance to bowing.

In one preferred embodiment, the core of rigid plastics foam is in the form of one or more rectangular blocks of said foam, at least one of the skins includes one or more depressed zones and the portion of the block or blocks behind each said zone conforms to the contours of said zone as a result of selective controlled crushing of the foam in the area behind said zone.

The panel skins are made from vacuum-formable sheets. Each skin may be formed by drawing the sheet down on to a suitable mould by vacuum forming.

The doors of the preferred embodiments of the present invention, when produced using a filled phenolic foam in the core exhibit resistance to bowing or warping on heating up to about 50° C. and even above. Without wishing to be bound by any theory it is believed that the rigidity of the foam core to which the vacuum formed skin is bonded prevents the bowing of the skin and that the normal expansion of the skin due to heat is absorbed in some other manner such as an adjustment of the thickness of the skin. In any event, bowing can be substantially eliminated in the panels of the invention. In the case of a conventional foam core, such as of foamed polystyrene, on the other hand, it is believed that the core is insufficiently strong to resist the force on the skin which causes the bowing and either the foam is torn or else it is distorted, e.g. stretched, by the bowing. It is further considered that this inherent weakness of the core is further exacerbated by heat. Thus, as the temperature to which the skin is exposed is increased, so the ability of the foam to resist the bowing force is reduced.

If it is desirable that the doors be resistant to internal movement at higher temperatures, the foam core can be treated such that it has cured fully prior to the formation of the door.

The edges of the door may be left uncovered e.g. to expose the side faces of the stiles and rails where the door contains such frame members, or the edges may be capped, e.g. with uPVC cappings which may be bonded to the skins by adhesive or by heat sealing, or with extruded metal, e.g. aluminium, sections which may be attached by any suitable means such as screws. Alternatively one or both of the skins may be formed during the vacuum forming process with lips which cover the edges of the door and hence the side faces of any stiles and rails.

The panel is preferably constructed so that it does not require the skills of a craftsman to hang in place. Thus, there is provided a weather resistant panel comprising front and back faces, top and bottom faces and two side faces wherein each side face has a channel extending therealong, each of said channels being sized to receive a longitudinal cap member.

The channel extending along each side face is preferably of the same width and depth and is preferably located centrally in the width of the side of the panel. Thus, the two sides of the panel will be the same such that, subject to any design, such as panelling, on the faces of the panel, it can be left hand or right hand hung.

Each channel is preferably of generally rectangular cross-section and the depth of the channel may be greater than the depth of a portion of the cap member which will extend into the channel. The additional depth is preferably from 2 mm to 8 mm, most preferably 5 mm.

One benefit of having this additional depth to the channel is that if when the panel is to be hung in place, it is found to be larger than the space available, the panel can readily be reduced in size by removing wood from the side faces of the panel without affecting the ability of the channel to receive the cap member.

The width of the channel is preferably from 10 mm to 40 mm, more preferably 30 mm. As has been stated, whatever the width of the channel, the channel is preferably located concentric to the side face of the door.

The door may also include channels in at least one of the top and bottom faces. These channels are also shaped to receive cap members and are preferably located concentric to the face of the door. The top and bottom channels are preferably of the same size and configuration.

A longitudinal cap member suitable for insertion in one side channel of the panel preferably comprises a pair of upper flanges in a common plane which are spaced apart and conjoined by a lower flange located beneath the pair of flanges and parallel therewith.

The combined widths of the two upper flanges and the gap between them is preferably equal to the width of the panel. The widths of the two upper flanges are preferably different. The flanges are preferably arranged such that when the cap is placed in one side channel of the panel, the lower flange is located in the channel and an upper surface thereof is collinear with the upper surface of the walls of the channel and the upper flanges extend over the upper edges of the walls of the channel. This arrangement means that a leaf of a hinge may be readily recessed in the finished panel such that it can be correctly hung in place. In order to locate the hinge, a section of one of the upper flanges may be removed such that the leaf of the hinge can lie across the upper edge of the wall of the channel and across the upper surface of the lower flange. The length of the section of the flange removed will depend on the length of the hinge.

The two upper flanges may be of different widths. This will enable the same cap member to be suitable for use with one of two different sizes of hinge. In the UK two standard sizes of hinge are commonly used with household doors, these are 30 mm and 35 mm. Thus, in a particularly preferred embodiment of the present invention the widths of the upper flanges and the spacing between them are such that the distance from the outside edge of one flange to the opposed edge of the gap between the upper flanges is 30 mm and the distance from the outside edge of the other flange to the opposed edge of the gap between the upper flanges is 35 mm.

Two legs preferably extend downwardly from the flanges and are preferably located such that in use they are a sliding fit with the inner walls of the channel in the door. They preferably extend downwardly from the flanges for a length that is less than the depth of the channel. A foot member may extend inwardly from each leg to form a ledge extending along the cap member below the plane of the lower flange. This ledge enables a plate to be located below the lower flange and spaced therefrom. When a hinge has been located on the upper face of the lower flange, it will be fixed to the lower flange, preferably by means of at least one screw. If a metal plate is located below the lower flange the, or each, screw will extend through the plate thereby strengthening the fixing of the hinge to the cap member.

As the cap member is separate from the panel, the panel fitter, can place the cap member against the panel frame to accurately note the position of the hinge before it is fitted to the door. The appropriate portion of one flange can then be removed from one of the pair of upper flanges and the hinges connected to the cap member before the cap member is inserted into one side channel in the panel. The door may then be hung in place in the conventional manner. In one alternative arrangement, the cap member having had the hinge members located on its surface may be connected to the door panel via the hinges before it is placed in the channel of the panel.

The cap member may be held in place in the channel by any suitable means. In a preferred embodiment, the cap member will be attached to the panel by means of screws.

The configuration of the cap member selected for use in the opposing side face to that carrying the hinges will depend on the type of locking mechanism to be used. Suitable locking mechanisms include conventional mortice locks and multi-point locks fitted to a groove known as a Eurogroove or any other suitable groove.

A longitudinal cap member suitable for insertion in one side channel of the panel preferably comprises a flange, preferably having a width corresponding to the width of the panel. This cap member is also suitable for use in the top or bottom channel of the panel, where present and is particularly suitable for the top channel.

Two legs preferably extend downwardly from the flange and are preferably located such that in use they are a sliding fit with the inner walls of the channel in the door. They preferably extend downwardly from the flange for a length that is less than the depth of the channel. A foot member may extend inwardly from each leg to form a ledge extending along the cap member below the plane of the flange. This ledge enables a plate to be located below the flange and spaced therefrom. This plate can be used to strengthen the attachment of the lock to the cap member.

The cap member may be provided with a plate located on the ledge.

When the panel is to be hung in place, the cap member may be held against the panel frame and the position of the lock accurately noted before an appropriate section is cut from the cap member. The cap member may then have the lock fitted before being located in the channel. The cap member will then be placed in the channel and may be fastened in place by means of screws, glue or both screws and glue.

The ledges of the above second and third aspects may be located from 0.5 mm to 2 mm below the lowest surface of the flanges, preferably 1 mm.

A longitudinal cap member suitable for insertion in one side channel of the panel preferably comprises a pair of coplanar spaced apart flanges and a trough member. This cap member is also suitable for use in the top or bottom channel of the panel, where present, and is particularly suitable for the bottom channel. When the cap member is used in a side channel of the panel it is suitable for use with a multi-point lock. If the cap member is used in the bottom channel of the panel, the trough member may include a draft excluder, such as a brush or flipper seal.

Where a panel comprises the channel and cap members described above, there is open space located around the periphery of the panel. Without wishing to be bound by any theory it is believed that the expanding gases which travel through the foam in the manner described when the panel is exposed to increased temperature vent into this void space and thus pressure at the surface of the door is reduced. Further, where the panel is a door, the cap members will include apertures for the hinges and locks allowing venting of the gases to air.

In a particularly preferred embodiment of the present invention the panel comprises a frame, having channels as described above, a foam core comprising an open cell foam of the kind described above and cap members of the kind described above. Most preferably the panel is a door.

The production of a panel in accordance with the particularly preferred embodiment of the present invention will now be described in greater detail with reference to one embodiment and with the aid of the accompanying drawings in which:

FIG. 6 is a cross-section of a lock side (for use with a mortice type lock) located in a channel—also suitable for use as a top cap member;

FIG. 7 is a perspective view from above of the cap member of FIG. 6;

FIG. 8 is a perspective view from below of the cap member of FIG. 6;

FIG. 9 is a cross-section of a lock side (for use with a three-point lock) located in a channel—also suitable for use as a base cap member;

FIG. 10 is a perspective view from above of the cap member of FIG. 9;

FIG. 11 is a perspective view from below of the cap member of FIG. 9.

A door in accordance with the present invention is formed by first forming the skins. Using a suitable mould panel skins 8, 10 are vacuum formed in known mammer from uPVC sheets to resemble the faces of a conventional six panel door with a wood grain effect moulded into the face which is to provide the outer surface of the skin. The sheets may be self-coloured in a yellowy brown hue similar to oak.

Figure 1:
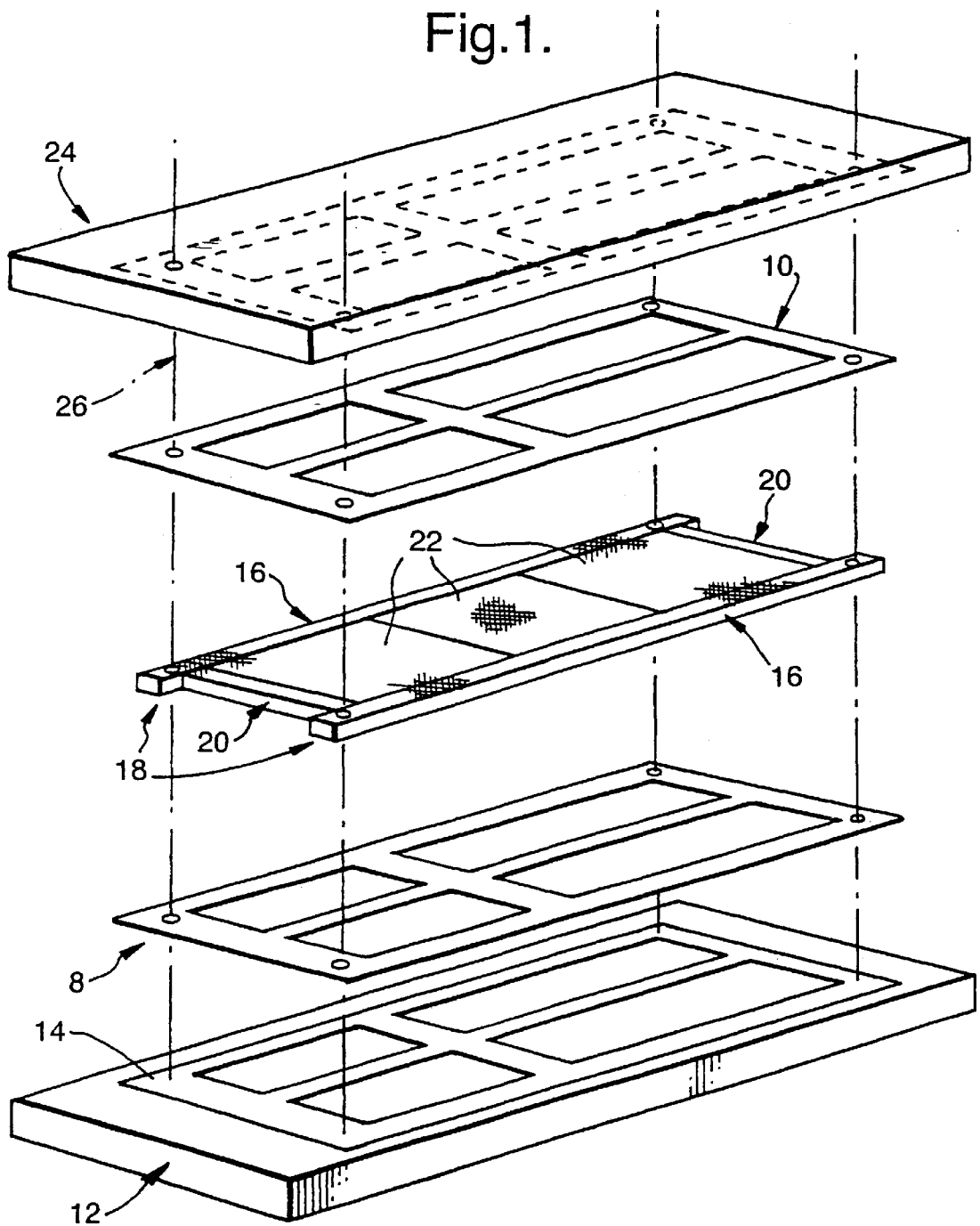
FIG. 1 is an exploded perspective view of the manufacture of a panel.

Referring now to FIG. 1, one of the skins 8 is placed face down on the platen 12 of a press, the platen having located thereon a mould jig 14 which matches the contours of the moulding, and a suitable adhesive, preferably an unsaturated polyester-based adhesive, is applied to the upturned face, which is the rear face, of the sheet.

In a separate operation, not illustrated, the components of a softwood frame 16 comprising a pair of vertical stiles 18 and two or three horizontal rails 20 are located on a support surface and rectangular blocks 22 cut from a pre-formed slab of open cell foam, such as filled phenolic foam sold under the trade name ACELL by Acell Holdings Limited of appropriate dimensions are fitted to substantially fill the spaces between the stiles and rails, the thicknesses of the blocks being substantially the same as that of the stiles and rails, and the lengths and widths of the blocks being such that they just fill the spaces between the stiles and rails. The whole is then bonded together using a suitable adhesive.

This preformed assembly is positioned on the adhesive-coated upturned face of the vacuum-formed skin 8.

With the other vacuum formed skin 10 placed face down, its upper, or rear face, is coated with the adhesive and the skin is then turned over and located, with the adhesive-coated rear face facing downwards, on top of the assembly of stiles, rails (which together form the frame) and blocks of the open cell foam. The top platen 24 of the press, which carries a mould jig 26 which matches the contours of the moulding on the skin 10, is then lowered on to the assembly and pressure is applied.

The pressure is such as to cause the foam blocks to be crushed locally between the depressed zones of the vacuum formed sheets as these areas are forced into the foam, whereby the assembly of blocks 22 and frame members 18,20 is fly held between and in contact with the two skins. At the same time, some of the adhesive coated on the face of each of the vacuum formed skills is forced into the surface layers of the blocks. The pressure is maintained until the adhesive has cured and set and the skins, blocks and frame members are securely bonded together. Suitable pressures are of the order of 0.5 to 30 kg/cm$^2$ but it will be understood that as the depressed zones of the skins are the first to come into contact with the foam blocks, the pressures applied locally in the depressed zones and which cause localised crushing of the foam are much higher, perhaps of the order of 5 to 100 kg/cm² or more. Therefore foams may be used which are crush resistant up to this level of pressure, thereby considerably enhancing the impact resistance of the panels.

If desired, several panels may be laminated at the same time by placing the assemblies one above the other in the press.

Preferably, the assemblies are located within frames during pressing to prevent any distortion in a plane perpendicular to the direction of pressure.

After removal of the panel from the press, its surface finish may be improved by applying a stain of different colour to the sheet and then removing the stain from the high points, e.g. by wiping, so that it is left substantially only in ingrained areas.

The resultant panel bears an excellent resemblance to a conventional wooden panel with close reproduction of the contours of the panelling and a realistic grain effect. Despite the open-cell nature of the foam, its insulation properties are about the same as those of a conventional PVC panel with a polystyrene foam core. Because a rigid foam is used and the foam can substantially completely fill all the voids between the frame members, the panel is strong and resistant to warping and its impact strength is greater than that of conventional PVC panels with a polystyrene foam core. The percolation of the adhesive into the surface layers of the foam ensures an improved bond between the core and the skins, thereby reducing risk of delamination. Absorption of any trapped moisture or solvent into the open-cell foam reduces the risk of localised build-up of pressure and concomitant bubbling or failure of the adhesive bond.

The use of a filled phenolic foam such as the foam available from Acell Holdings Limited in the core endows the panel not only with a substantial resistance to distortion, especially bowing, when exposed to temperature changes but also with a very desirable combination of flame resistance, heat and sound insulation, impact strength, rigidity and resistance to flexure.

Figure 2:
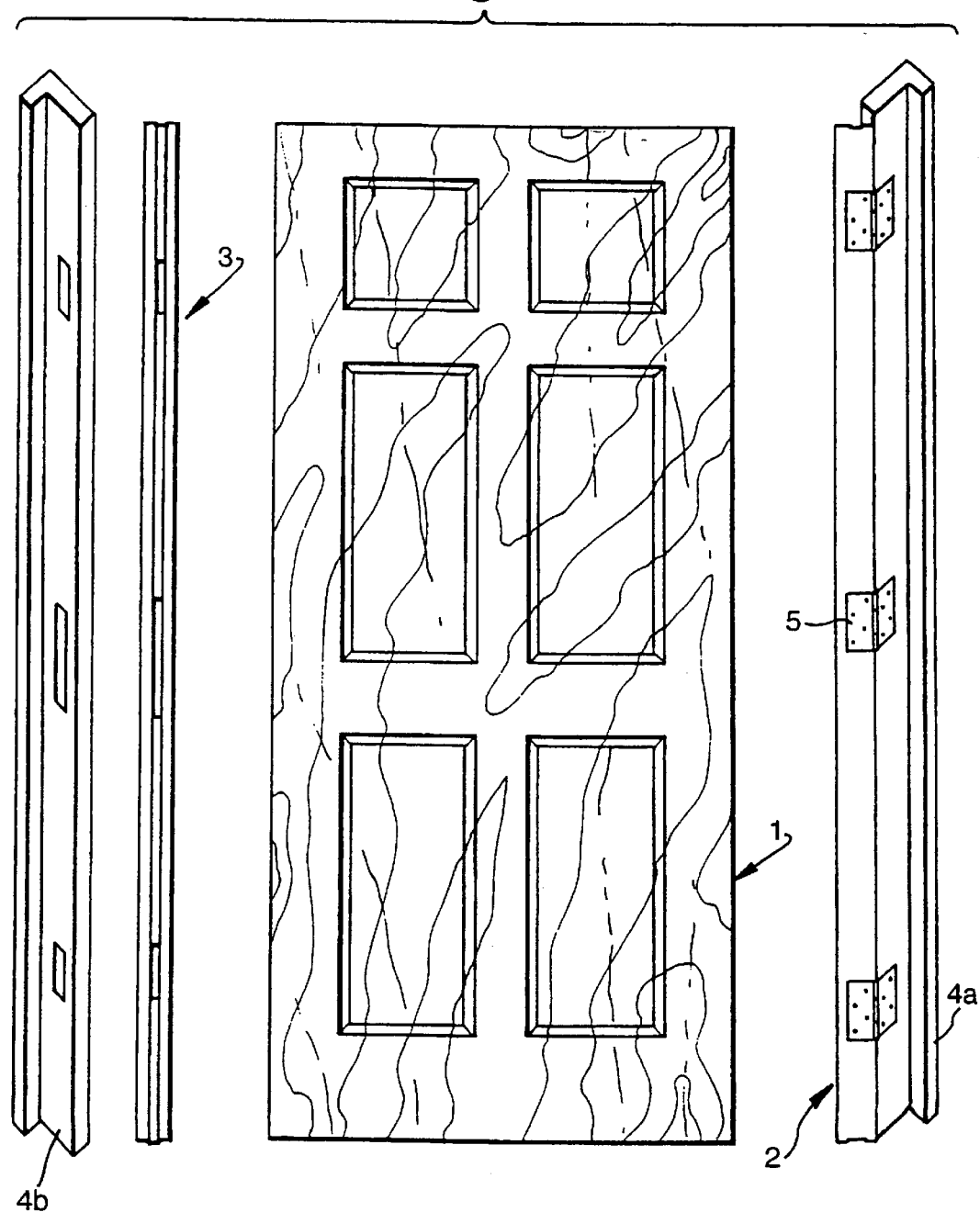
FIG. 2 is an exploded view of a door and two side cap members and two portions of a door frame for illustrative purposes.

Preferably the door includes the above-described system to facilitate sizing and fitting of the panel. If this system is to be utilised, as illustrated in FIG. 2, the finished door comprises a door 2 having side channels, not shown, and side cap members 2 and 3. When hanging the door the cap members are placed against the door frame 4a and 4b. The position of the hinges 5 is noted and the cap member 2 is cut to allow the leaf of the hinges to be recessed in the cap member. The cap member 2 may be fastened to the door frame 4a before the cap member is placed in the channel in the door 1. The position of the lock is noted and the cap member 3 is cut to allow the locks to be placed therethrough. FIG. 2 illustrates a cap member for use with a multi-point lock and thus three sections are preferably removed.

Figure 3:
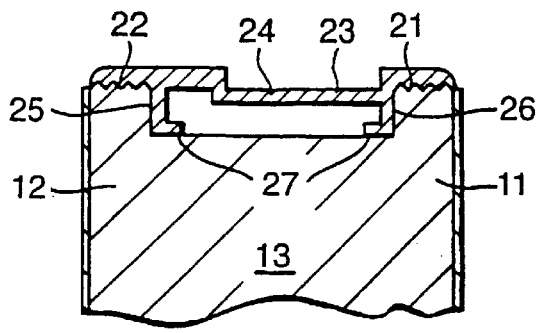
FIG. 3 is a cross-section of a hinge side cap member located in a channel.
Figure 4:
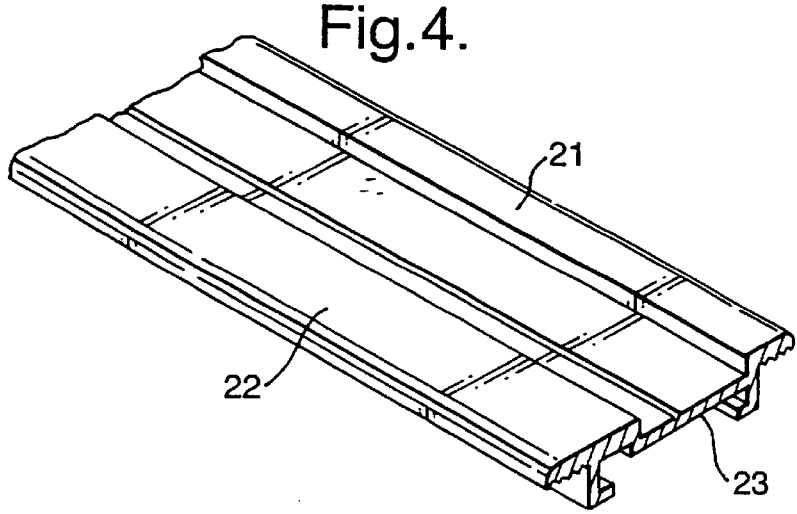
FIG. 4 is a perspective view from above of a hinge side cap member.
Figure 5:
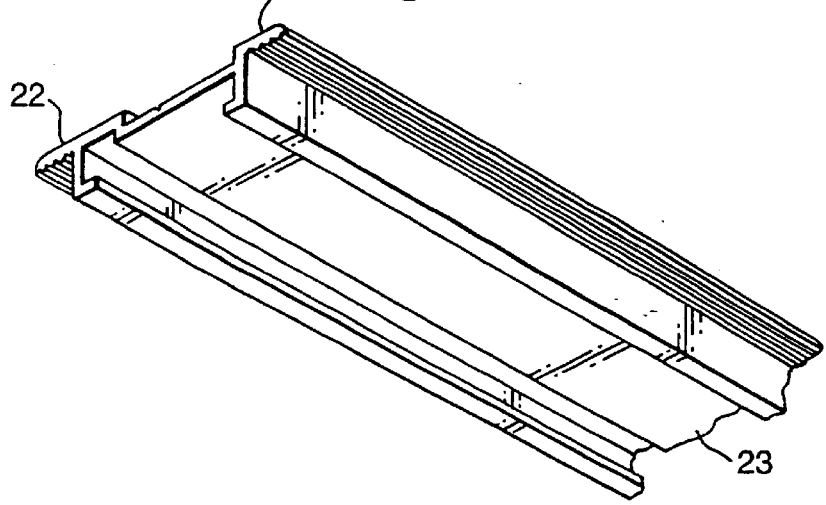
FIG. 5 is a perspective view from below of a hinge side cap member.

The configuration of a suitable cap member for use with hinges is illustrated in FIGS. 3, 4 and 5. The cap member comprises a pair of upper flanges 21 and 22 in a common plane which are spaced apart and conjoined by a lower flange 23 located beneath the pair of flanges 21 and 22 and parallel therewith.

The combined widths of the two upper flanges 21 and 22 and the gap 24 between them is equal to the width of the door. The widths of the two upper flanges are different. The flanges are arranged such that when the cap is placed in one side channel of the door, the lower flange is located in the channel and an upper surface thereof is co-linear with the upper surface of the walls 11 and 12 of the channel 13 and the upper flanges 21 and 22 extend over the upper edges of the walls of the channel. This arrangement means that a leaf of a hinge may be readily recessed in the finished door such that it can be correctly hung in place. In order to locate the hinge, a section of one of the upper flanges may be removed such that the leaf of the hinge can lie across the upper edge of the wall of the channel and across the upper surface of the lower flange.

The two upper flanges 21 and 22 are of different widths. Thus the same cap member is suitable for use with both 30 mm and 35 mm hinges.

Two legs 25 and 26 extend downwardly from the flanges and are located such that in use they are a sliding fit with the inner walls of the channel in the door. They extend downwardly from the flanges for a length that is less than the depth of the channel. A foot member may extend inwardly from each leg to form a ledge 27 extending along the cap member below the plane of the lower flange 23. This ledge 27 enables a plate to be located below the lower flange and spaced therefrom and may be used for fixing the hinge plate prior to fitting the cap member in the groove.

The configuration of a suitable cap member for use with a mortice is illustrated in FIGS. 6, 7 and 8. The cap member comprises a flange 31 having a width corresponding to the width of the door.

Two legs 32 and 33 extend downwardly from the flange 31 and are preferably located such that in use they are a sliding fit with the inner walls of the channel 13 in the door 1. They preferably extend downwardly from the flange for a length that is less than the depth of the channel. A foot member extends inwardly from each leg to form a ledge 27 extending along the cap member below the plane of the flange 31. This ledge enables a plate to be located below the flange and spaced therefrom. This plate can be used to strengthen the attachment of the lock to the cap member and may be used for fixing the lock prior to fitting the cap member in the groove.

A cap member for insertion in one side channel of the door for use with a Eurolock is illustrated in FIGS. 9, 10 and 11. The cap member comprises a pair of coplanar spaced apart flanges 34 and 35 and a trough member 36.

The channel in the external perimeter of the frame may be formed before or after the final panel has been constructed. The panel may also be produced at one size and then cut after being formed to the particular requirements. Thus where the panel is a door, the panels may be formed of a standard size and then machined to fit particular door frame apertures.

While the invention has been described with reference to the production of a solid panelled panel, it will be understood that apertures may be provided if desired, e.g. for glazing.

When a panel of this kind is exposed to changes in temperature and in particular to the application of heat on one side, it would be expected that the skin would exhibit bowing. In prior art arrangements, for example, one would expect bowing in the region of 12 mm or the like. In contrast, with a panel of the present invention, bowing is not detected at all or only a bow of 1–2 mm at temperatures in the order of 50° C.

Tests have been carried out to consider the effect on the door of higher temperatures. In these tests, the samples are placed in an oven for one hour at 80° C. and then for two hours at 70–73° C. The results obtained are set out in Table 1.

TABLE 1

| | weight (kg) b.t. | length (mm) b.t. | width (mm) b.t. | thickness (mm) b.t. | density (kgm$^{-3}$) b.t. | weight (kg) a.t. | length (mm) a.t. | width (mm) a.t. | thickness (mm) a.t. | density (kgm$^{-3}$) a.t. | weight Δ % | length Δ % | width Δ % | thickness Δ % |
|---|---|---|---|---|---|---|---|---|---|---|---|---|---|---|
| sample 1 | 0.81 | 517 | 502 | 42 | 74 | 0.76 | 515 | 500 | 42 | 70 | 6 | 0.38 | 0.04 | 0 |
| sample 2 | 1.19 | 517 | 502 | 42 | 117 | 1.1 | 515 | 482 | 42 | 109 | 7.5 | 0.4 | 0.41 | 0 |

After the test samples are slightly bent.
Test consists of putting the sample in an oven for 1 hour at T = 80° C. and for 2 hours at T = 70/73° C..
Total time in the oven is 3 hours.
Key:
b.t. = before test
a.t. = after test A six-panel door according to the invention and made from vacuum-formed uPVC skins, a softwood frame and blocks of ACELL foam in the manner described above with reference to FIG. 1, was tested in accordance with test BS476 Part 22;1987 The specimen tested was a fully insulated single acting single leaf doorset. The subject was mounted into a masonry wall and oriented such that it opens towards heat provided by a furnace. The dimension of the doorset under test was 2072 mm high by 893 mm wide. At its thinnest point (centre of the panels) the door was 13 mm thick. After 40 minutes the mean temperature of the door surface away from the heat source was 90° C. while that of the door surface exposed to the heat source was 900° C.

After 15 mins exposure the maximum deflection was only 5 mm towards the furnace.

Further tests were conducted on two door sets formed as described above. The test procedures used are set out as Test 10 and Test 11 in BS DD171:1987. A new European standard was being drafted at the time of the tests (prEN1121). Whilst test procedures and limiting value of bow had not been finalised, reference is made to the new standard and the doors were classified according to the proposed limiting values for bow.

The dimensions of the door leaves were 800 mm×1970 mm and they were mounted in frames. The doors were of similar construction and were fully furnished.

The experimental equipment comprised two climatic chambers separated by an insulated partition. Each chamber incorporated air conditioning equipment which allowed the simulation of internal and external climates. One chamber was as the "external chamber" (where Ea=initial equilibrium conditions, Eb=test conditions and Ec=higher thermal temperature) and the other as the "internal chamber" (where Ia=initial equilibrium conditions, Ib=test conditions and Ic=higher thermal temperature). Both chambers have dual controls for humidity and temperature. The pre-set values were as set out in Table 2 below.

TABLE 2

| Hygrothermal test | |
|---|---|
| External chamber | Ea: 25° C./60% rh (relative humidity) |
| | Eb: 5° C./85% rh |
| Internal chamber | Ia: 25° C./60% rh |
| | Ib: 28° C./40% rh |
| Thermal test | |
| External chamber | Ea: 28° C. |
| | Eb: 40° C. (hot) −10° C. (cold) |
| | Ec: 50° C. and 60° C. |

TABLE 2-continued

| Internal chamber | Ia: 28° C. |
|---|---|
| | Ib: 28° C. |
| | Ic: 28° C. |

The doors sets were mounted in the dividing partition between the two chambers with the external face of each door facing into the external chamber. A mounting system securely fixed each door frame into the partition.

Distortion of the door styles, the opening lock side and the hinge side, was measured with a movement bridge. This consisted of a aluminium beam 1950 mm long with a dial gauge mounted at its centre. The beam had a blunt knife edge bearing foot at one end and spherical bearing foot at the other. The bridge was attached to and held against each door style by springs. This ensured that the same pressure was always exerted through the bearing feet on the door styles, thus ensuring consistent measurement of distortion. Bow at lateral positions on each door leaf (top and bottom) was measured in a similar way with a 685 mm bridge and this, due to its shorter length was held by hand against the door, but always supported in the same position on long screws.

The test was carried out in accordance with Test 10 and Test 11 of DD171 1987 which were designed for door leaves. However, it is now recognised that it is more meaningful to test door sets fully furnished and finished to simulate the in use of the doors more accurately. A new European test procedure recognises this, but it is still only in draft. In the absence of a complete documented European test the DD171 test procedure was used on the door sets rather than just on door leaves.

Hygrothermal Test

The experimental procedure was carried out in 3 phases as follows:

Phase 1—Equilibrium Conditions

The test procedure commenced by opening the chambers to each other with the air conditions held at 25° C./60% rh (Ea and Ia) as set out above. These conditions were maintained until both door leaves reached equilibrium and showed no movement of greater that 0.05 mm per day.

After the door sets reached equilibrium and immediately before the external and internal climates were applied, the bow of the lock side, hinge side, top and bottom of each door was determined with the measuring bridges. The measurements were taken on the internal side with the door leaves slightly open.

Phase 2—Dual Test Conditions

The chambers were then isolated from each other and the differential climates (Eb and Ib) set out above were applied. The bow of each style caused by the differential conditions was measured at daily intervals. The differential climate was maintained and measurements continued until the movement was less than 0.05 mm increase in bow per day.

As in phase 1 the distortion (bow) measurements were taken on the internal side with doors slightly open.

Phase 3—Equilibrium Conditions

After the completion of the test in the dual conditions (phase 2) the chambers were once again opened to each other with the air conditions held at 25° C./60% rh (Ea and Ia) as in phase 1. Bow was once again measured.

Thermal Test

The experimental procedure, as specified by DD171, was carried out in 3 phases. Extra test phases were included, in addition to those set but in DD171, in order to carry out an assessment on the doors at higher temperatures than directed by the standard. The procedure was as follows:

Phase 1 Equilibrium Conditions

Both chambers were held at 28° C. for 20 hours.

Phase 2 Test Conditions

Stage 1

The internal chamber was held at 28° C. while the temperature of the external chamber was increased to 40° C. and held at this increased temperature for 5 hours.

Stage 2

The internal chamber was held at 28° C. while the temperature of the external chamber was decreased to −10° C. and held at this lower temperature for 20 hours.

Phase 3 Test Conditions

The internal chamber was held at 28° C. while the temperature of the external chamber was increased to 50° C. and held at this increased temperature for 7 hours. Then the doors were once again equilibrated before the external sides were heated to 60° C. and held at this temperature for 7 hours.

Phase 4 Test Conditions

In separate tests, the temperature of the external chamber was increased to 70° C. and 80° C., respectively.

Distortion (bow) of each door was measured at the end of each phase. The measurements were taken on the internal side with the door slightly open. From these readings the average bow for the style and rail positions were calculated. In addition to this, the overall bow (the difference between the hot and cold external face), the bow due to heating (the difference between equilibrium and hot external face), and the bow due to cooling the external face (the difference between equilibrium and cold external face) were also calculated.

Results

Hygrothermal Test

Figure 12:
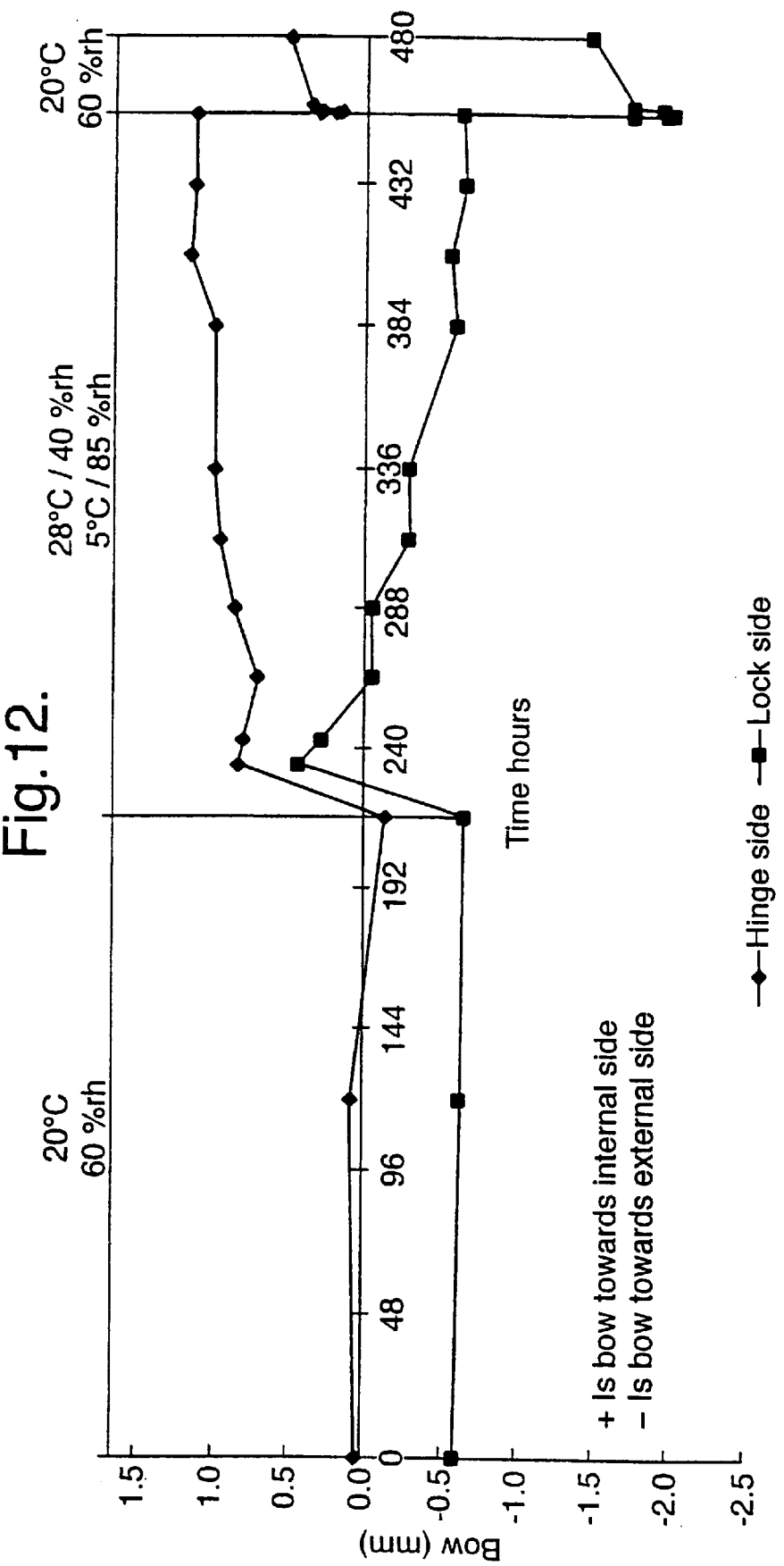
FIG. 12 is a graph illustrating bow under hygrothermal test on Door 1 for lock and hinge side.
Figure 13:
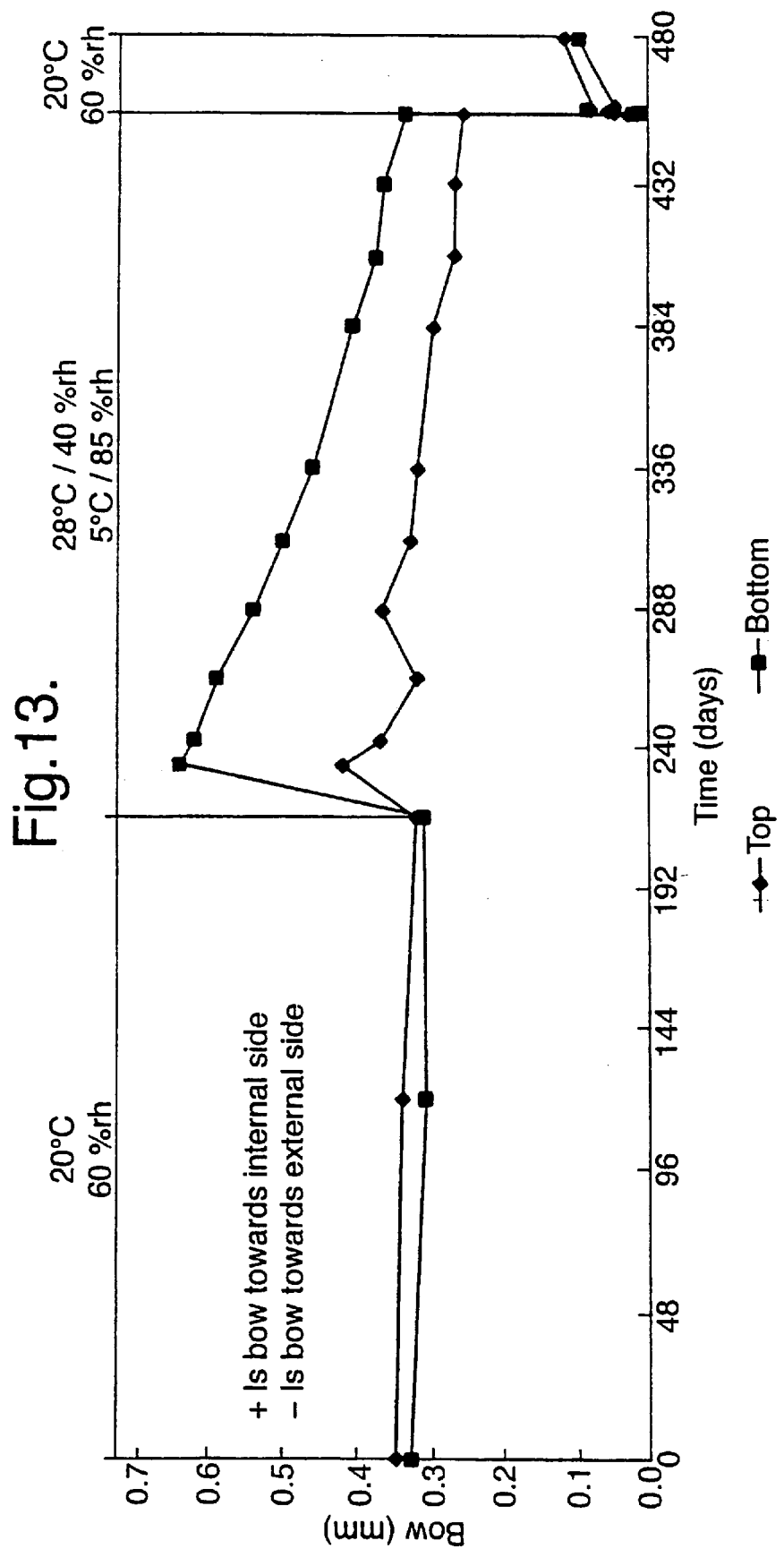
FIG. 13 is a graph illustrating bow under hygrothermal test on Door 1 for top and bottom.
Figure 14:
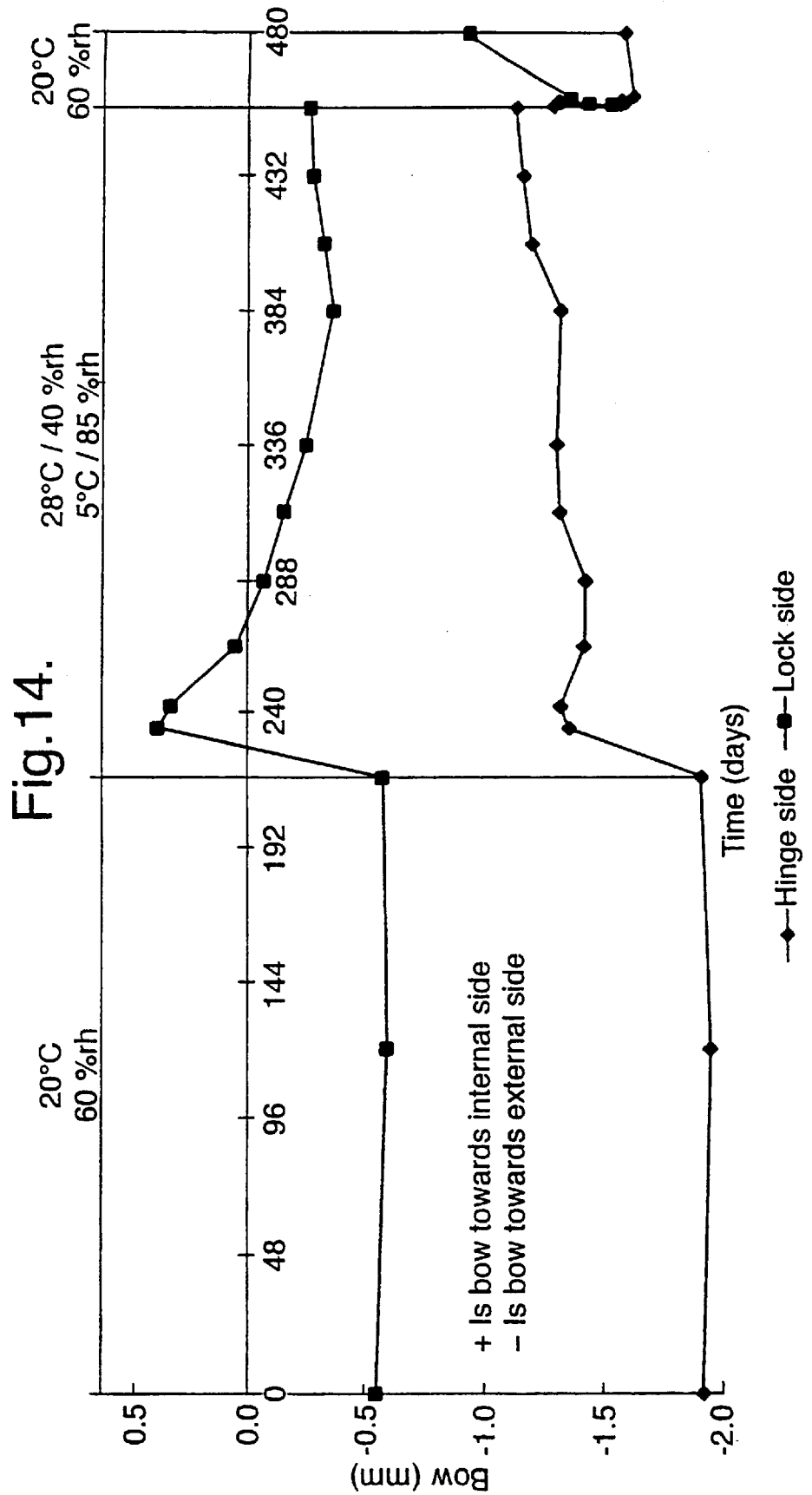
FIG. 14 is a graph illustrating bow under hygrothermal test on Door 2 for lock and hinge side.
Figure 15:
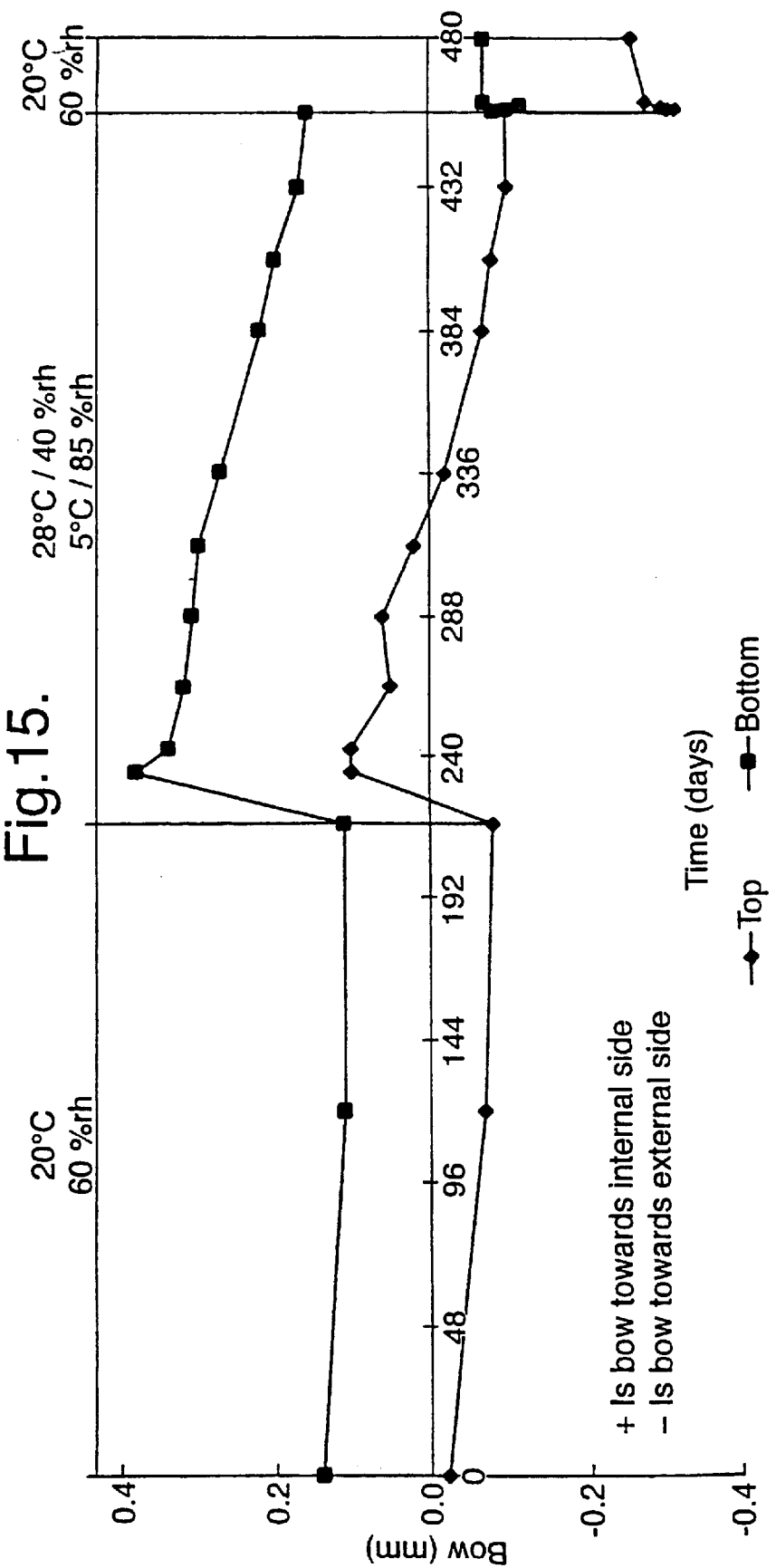
FIG. 15 is a graph illustrating bow under hygrothermal test on Door 2 for top and bottom;.

The alteration of bow values for each test phase is presented in FIGS. 12–15. Bow values for the vertical sides (lock and hinge sides), are shown in FIGS. 12 and 14, and for the top and bottom of each door, FIGS. 13 and 15. A summary of bow values is shown in Table 3.

Thermal Test

Figure 16:
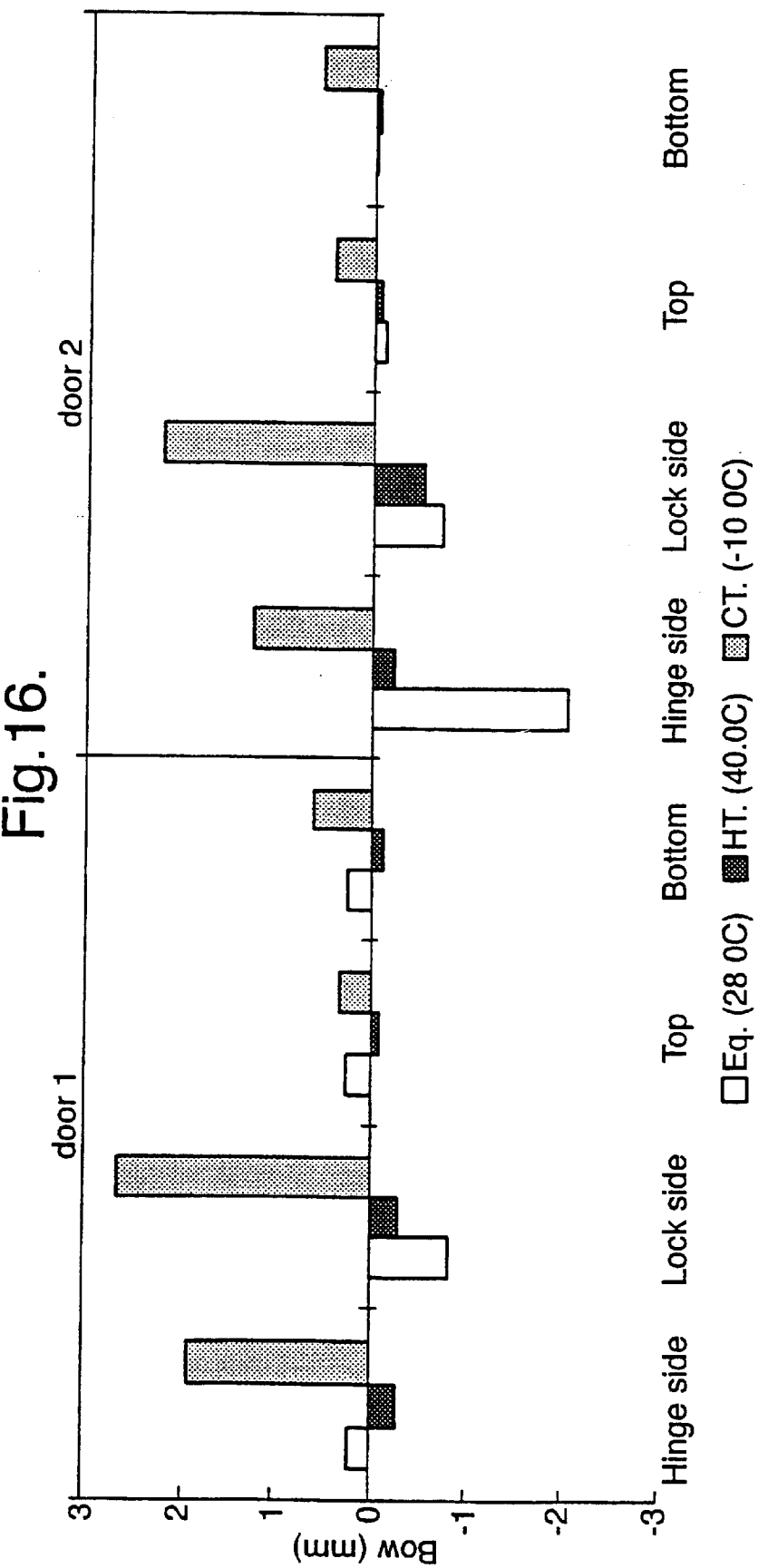
FIG. 16 depicts the actual bow measured during phase 1 and 2 test conditions.
Figure 17:
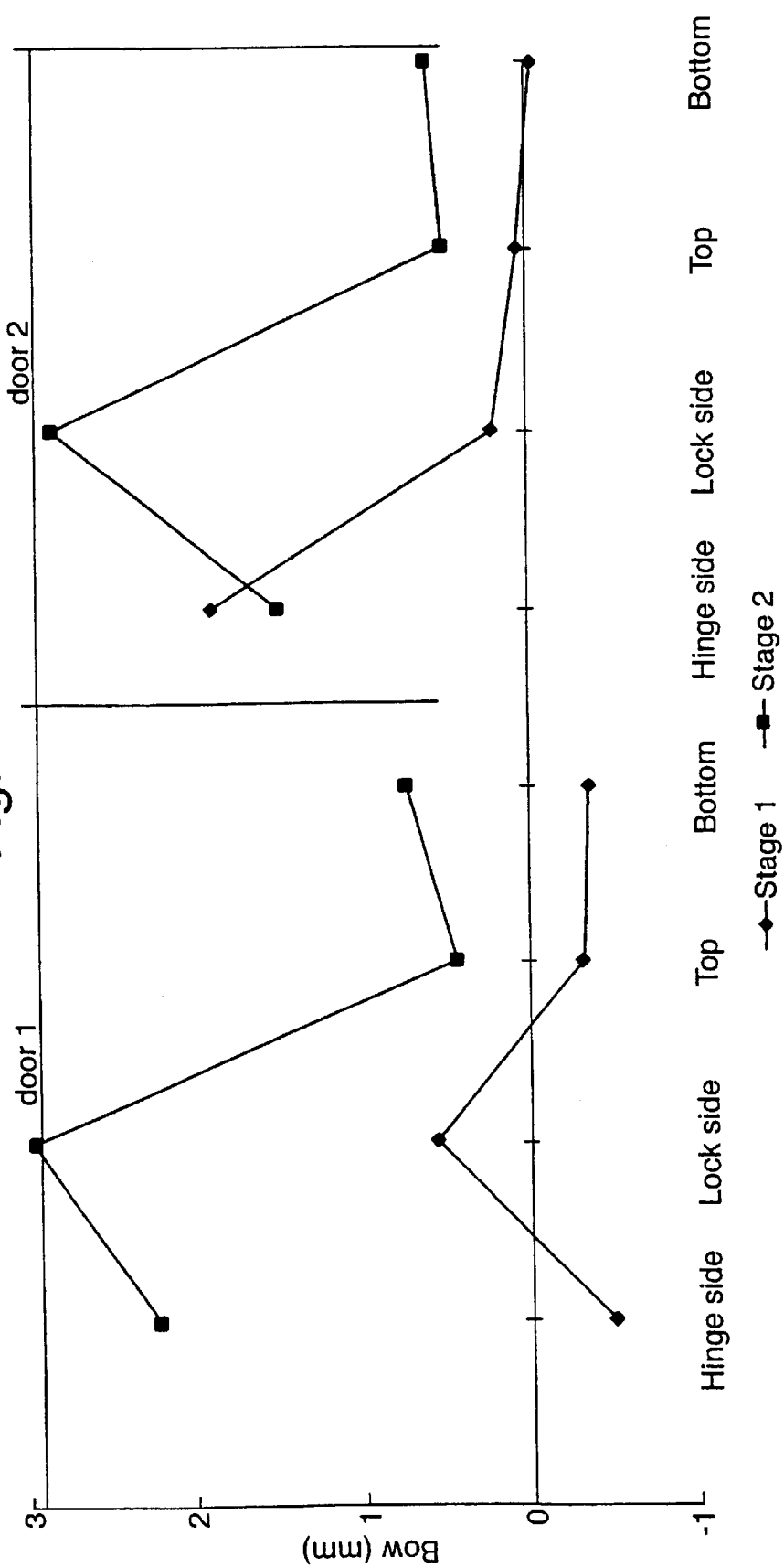
FIG. 17 depicts absolute bow measured during phase 2 test conditions.
Figure 18:
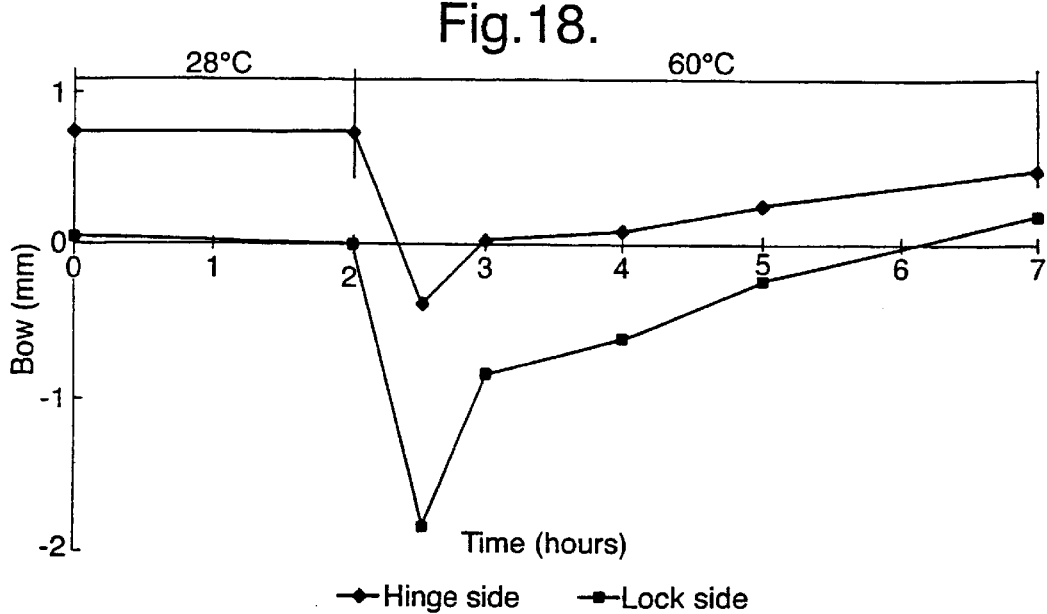
FIG. 18 is a graph of bow of door 1 subjected to 60° C. for hinge and lock side.
Figure 19:
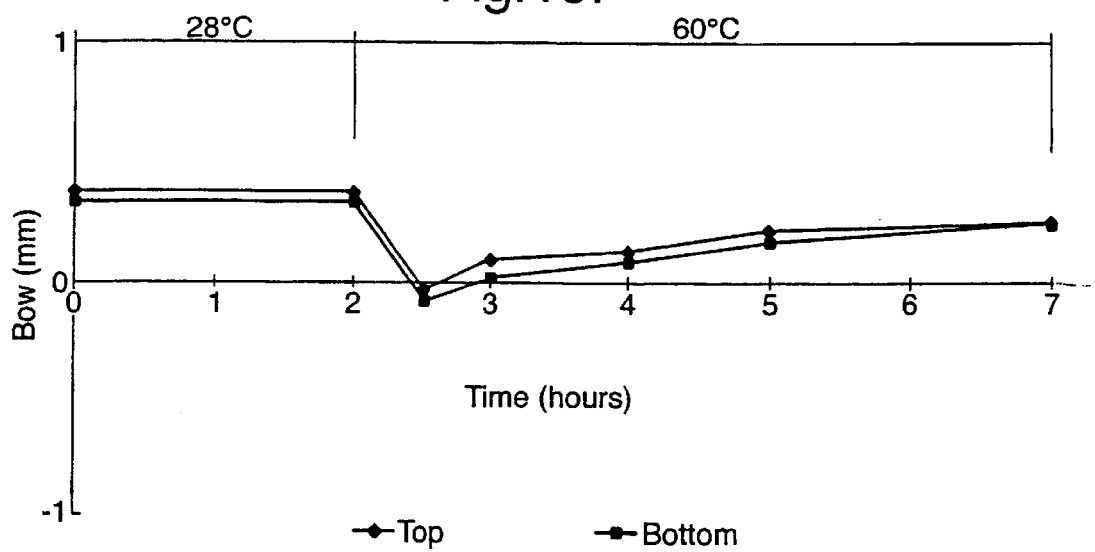
FIG. 19 is a graph of bow of door 1 subjected to 60° C. for top and bottom.
Figure 20:
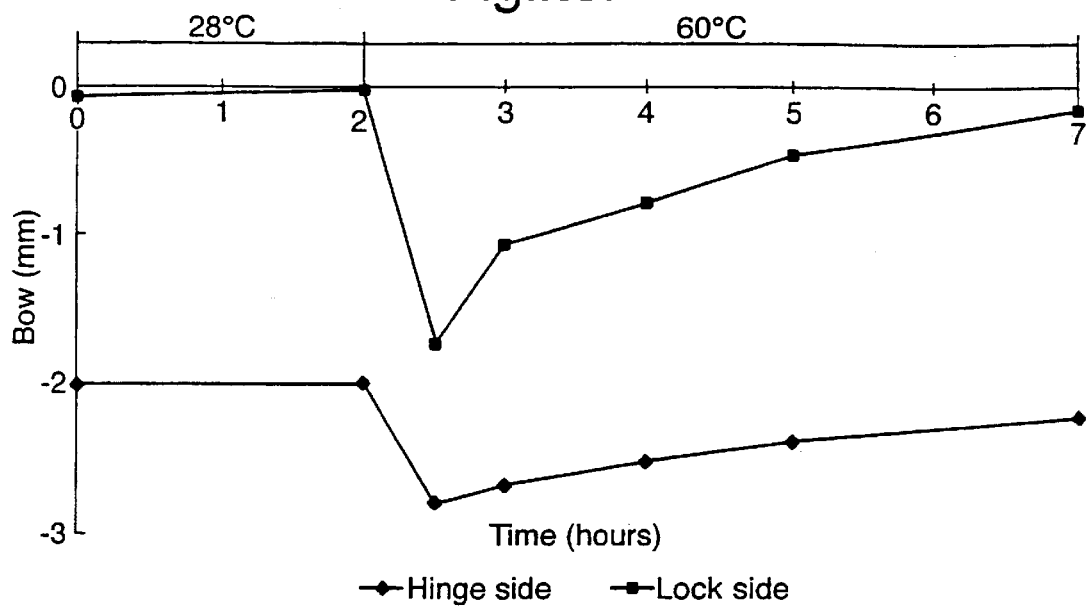
FIG. 20 is a graph of bow of door 2 subjected to 60° C. for hinge and lock side.
Figure 21:
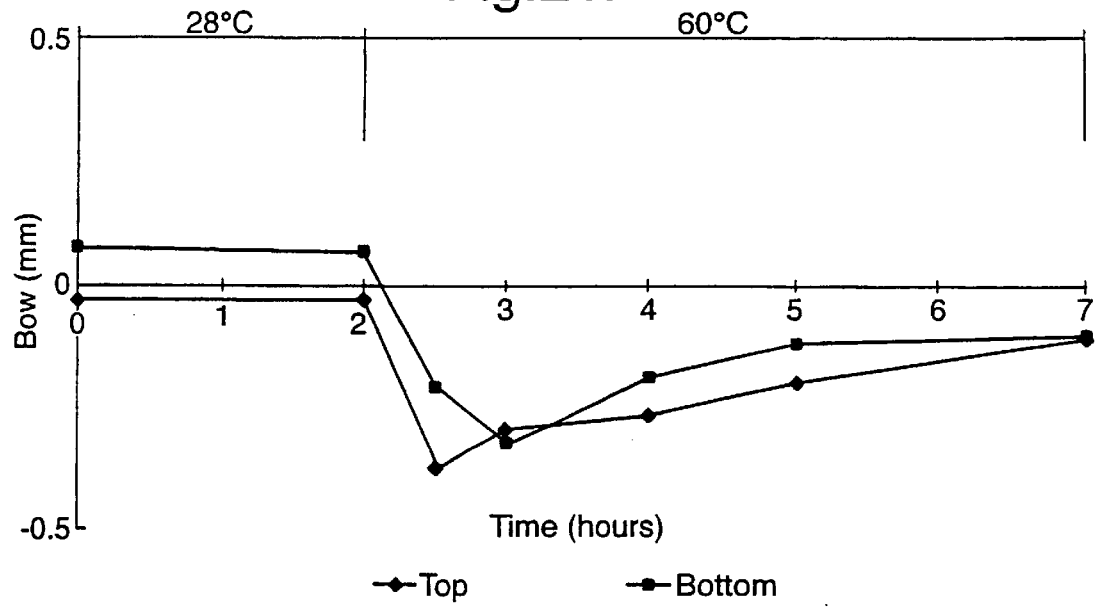
FIG. 21 is a graph of bow of door 2 subjected to 60° C. for top and bottom.
Figure 22:
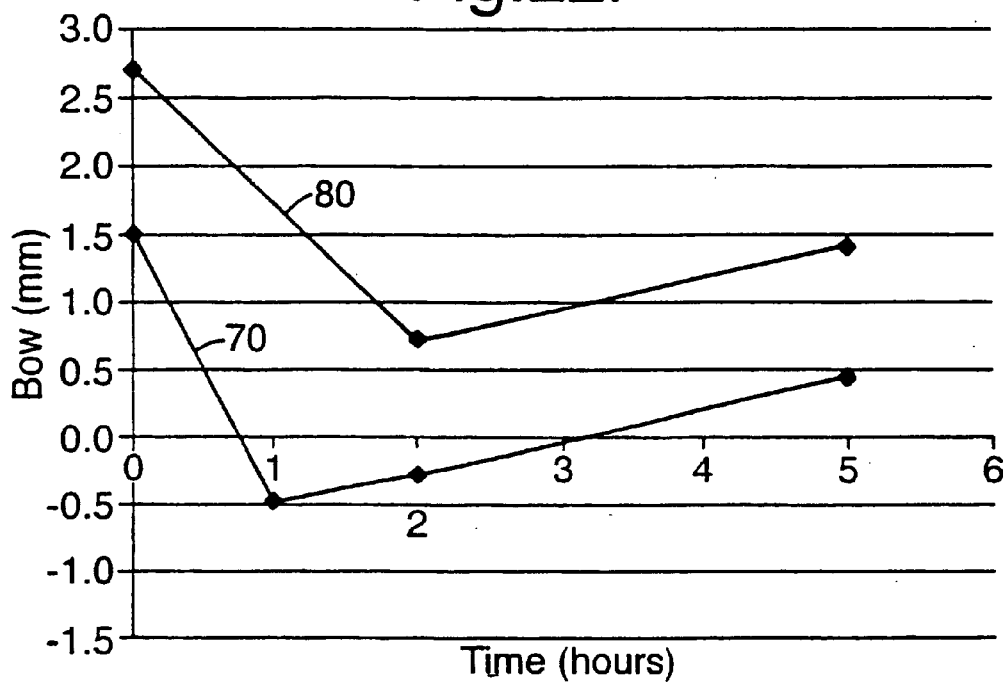
Figure 23:
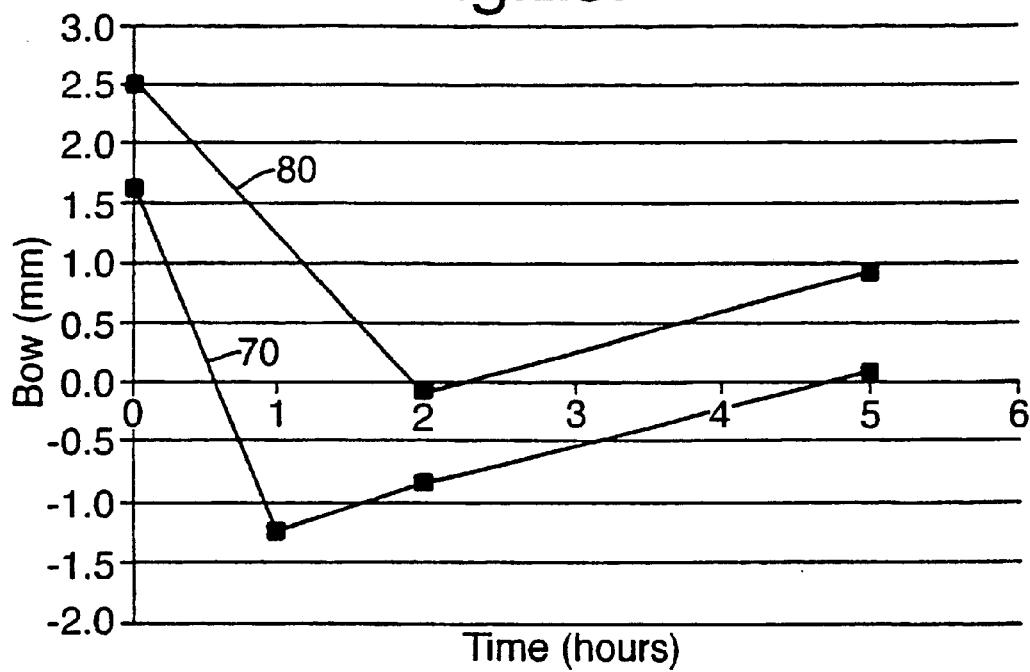
Figure 24:
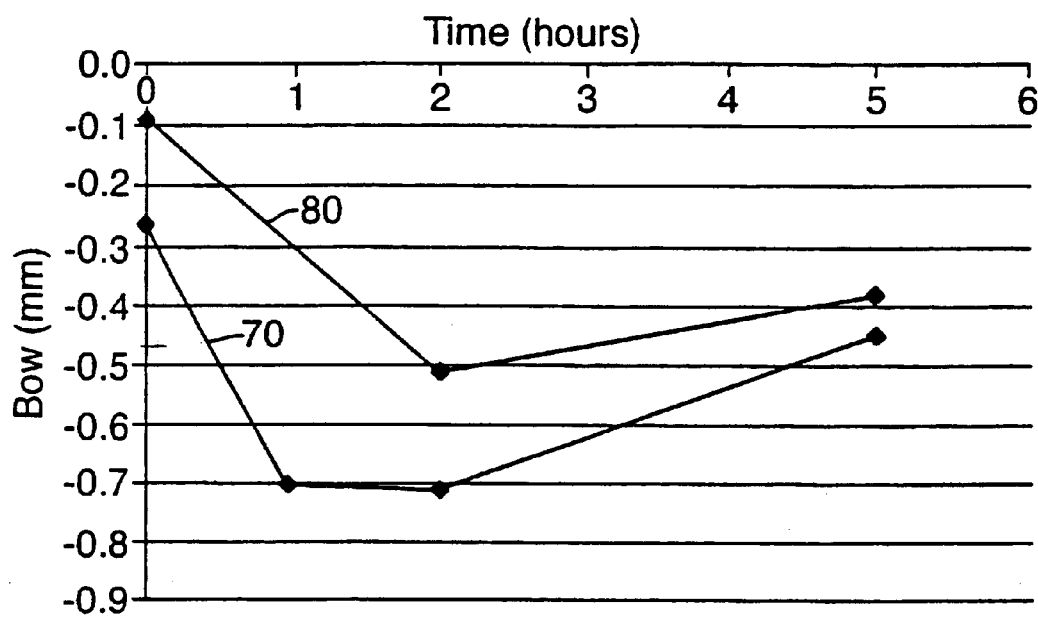
Figure 25:
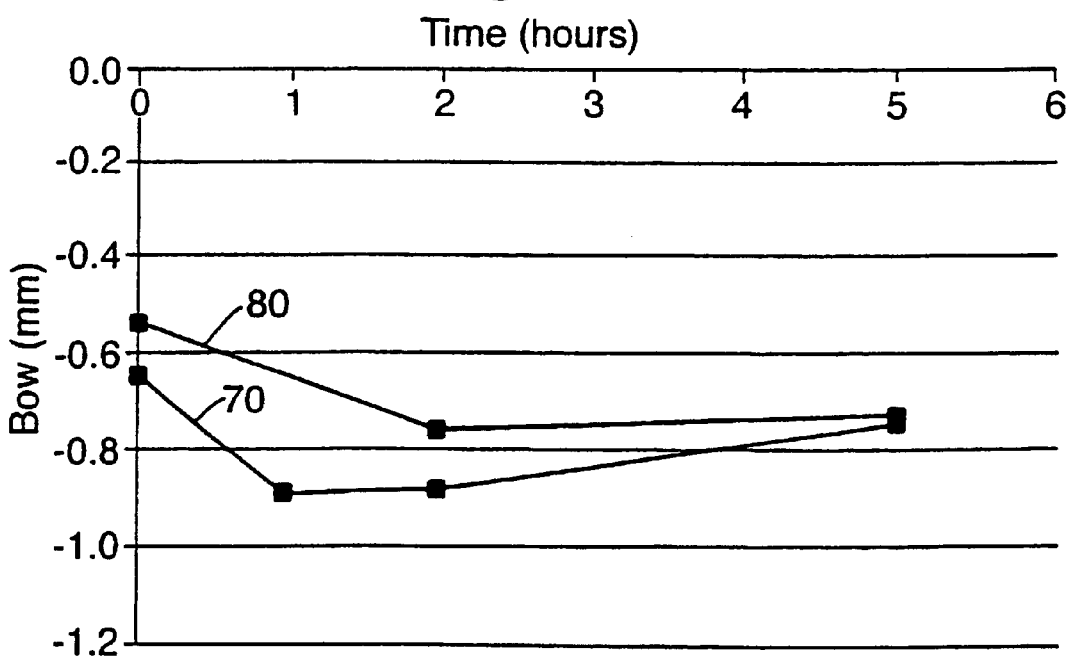

The results are presented in FIGS. 16–21, they indicate changes of bow for each test phase. FIGS. 16 and 17 concern the DD171 test and FIGS. 18–21 plot the bow movement of the doors when they were subjected to a higher temperature (60° C.) than that required by DD171.

The maximum bow values are summarised in Tables 4 and 5.

FIGS. 22 to 25 record changes of bow when the doors were exposed to the still higher temperatures of 70° C. and 80° C. respectively.

Discussion

Hygrothermal Test

Phase 1

Both doors exhibited some bow at the start of the equilibrium test phase 1, but there was little change during the short duration of the phase. This was probably due to the doors being stored in similar conditions before testing. Door 1 bowed very little whereas the hinge side of door 2 exhibited nearly 2 mm of bow.

Phase 2

When the dual conditions were set the lock and hinge vertical sides of each door initially bowed towards the positive (convexed) direction when viewed from the internal side of the doors. After this initial deviation the lock side of each door straightened and then exhibiting bow in the negative (concave) direction. In the case of the hinge side of both doors the bow deviation continued in the same direction as the initial bow. Door 1 remained convexed, bow in the positive direction, and Door 2 exhibited bow in the same direction, but because the bow at the start of phase 2 was −2 mm the effect of the continuing bow deviation was to straighten the door. Although starting from a slightly different initial bow the movement of the doors was almost identical for both the two lock side and the two hinged sides. The bow at the top and bottom of each door followed a similar pattern to the lock vertical sides, but was very small.

At the end of the dual condition phase of the hygrothermal test the lock side of both doors exhibited very little bow. In the case of the two doors under test the bow at the hinged side was higher than that exhibited on the lock side. However in both cases the bow was visibly insignificant.

Phase 3

At the end of the dual conditions phase of the test, equilibrium conditions were once again set. This caused an immediate bow in the concave (negative) direction for both doors. In both cases the hinge sides almost returned to their previous equilibrium bow of phase 1. However, in phase 3, the lock sides exhibited the greatest bow deviation of the complete test, about 2 mm, but this decreased in a few hours to a maximum of about 1.5 mm.

Phase 4 (Tests at 70° and 80° C.)

Bow after 5 hours in less than 1.5 mm in all cases.

Conformance to DD171

For both doors the bow movement was well below the maximum allowable value of

Conformance with Draft European Standard (prEN 11 21)

This draft new standard has 4 classifications from Class 0 through to Class 3. The maximum bow allowed in the classes is: no requirement, 8 mm, 4 mm and 2 mm respectively. The maximum bow is specified as the difference between the initial and final value or the actual final bow which ever is the greatest. This effectively means that the initial bow before the differential climates are set, is included in the maximum bow criteria. The test procedure is still in draft, but it is likely to suggest similar dual conditions for external doors as in DD171. However, in the draft prEN standard a phase 3 stage is not specified. On this basis we can consider the bow deviation at the end of phase 2 in the procedure used and comfortably assign the classifications of prEN1121. These are based on bow occurring on the lock side, according to the requirements set out in the European draft, and are as follows Door 1 is Class 3 (highest level of performance)

Door 2 is Class 3

Thermal DD171 Test

Phase 1

When the doors were at equilibrium at 28° C. (end of phase 1) they all exhibited some bow along the two longitudinal edges (lock side and hinge side) and on the two transverse edges (top and bottom). The results, FIGS. 12 and 13, indicate the direction and value of the bow distortion for each edge of each door and in general the values were small. The lock side bow of both doors was similar in the concave (negative) direction when viewed from the internal side of the doors. As in the hygrothermal test the bow for the hinge side of door 2 was about −2 mm.

Phase 2/Stage 1

After the differential conditions of Phase 2/Stage 1 were applied (28° C./40° C.) the distortion of each door decreased or remained at very low levels of bow in the concave (negative) direction. This was a similar trend as observed for composite GRP faced doors.

Phase 2/Stage 2

The differential conditions of Phase 2/Stage 2 (28° C./10° C.) caused, in general, bow distortion in the opposite direction, convexed (positive), to that of stage 1. This for all the measurement positions of both door leaves was greater than measured at stage 1, considerably so for the two longitudinal edges and the greatest bow was exhibited along the lock sides. Again, this is typical for a composite door and in the past has been observed for GRP skinned doors.

Conformance to DD171

For both doors the bow movement was visually insignificant and well below the maximum allowable value of 10 mm.

Conformance with draft European standard (prEN 1121)

Classifications can be assigned, based on bow occurring on the lock side, according to the requirements set out in the European draft prEN 1121 as follows:

Considering bow caused by heating and cooling

Door 1 is Class 2

Door 2 is Class 2

Considering bow caused only by heating

Door 1 is Class 3 (the best classification)

Door 2 is Class 3

Extra Thermal Test (Phase 3) 50° C. and 60° C.

Both doors were tested at higher temperature on the external side than specified in DD171 and extra bow from the equilibrium conditions was small and visually insignificant for both doors. The final values are shown in Table 3. The value for the hinged side of door 2 is higher than other values due to the relatively high initial bow which could have occurred during manufacture. Even for this side of door 2, the actual bow deviation after equilibrium condition and during dual conditions was very small. However, it should be noted that there is a sharp increase in bow movement between the external temperatures of 50° C. and 60° C.

The extra test was nearer to the conditions specified in the new European standard, prEN1121, than thermal test of DD171. Therefore, considering conformance with the new standard based on bow occurring on the lock side, the following classifications can be assigned:

Door 1 is Class 3 (the best classification)

Door 2 is Class 3

CONCLUSIONS

The performance of both the doors fully satisfied the limiting values for test DD171:1987 Test 10 (Hygrothermal distortion) and Test 11 (Thermal distortion).

The new European standard (prEN1121) is only in draft form, but it is likely that the classification assigned to the doors, considering only the hot external temperature, would be Class 3 (Class 3 being the highest level of performance). If the cooling phase of the current test procedure is considered, the classification of the doors would be Class 2.

TABLE 3

Summary of bow measurements

| Door | Side | Initial bow (mm) | Bow at end of phase 1 (mm) | Max bow in phase 2 (mm) | Bow at end of phase 2 (mm) | Initial bow in phase 3 (mm) | Bow at end of phase 3 (mm) |
|---|---|---|---|---|---|---|---|
| 1 | Hinge | 0.04 | −0.13 | 1.18 | 1.16 | 0.19 | 0.52 |
|   | Lock | −.059 | −0.65 | 0.43 | −0.6 | −2.01 | −1.45 |
|   | Top | 0.35 | 0.32 | 0.42 | 0.26 | 0.03 | 0.12 |
|   | Bottom | 0.33 | 0.31 | 0.64 | 0.34 | 0.01 | 0.1 |
| 2 | Hinge | −1.92 | −1.93 | −1.16 | −1.16 | −1.6 | −1.62 |
|   | Lock | −0.55 | −0.59 | 0.39 | −0.28 | −1.56 | −0.95 |
|   | Top | −0.02 | −0.08 | 0.1 | −0.1 | −0.32 | −0.26 |
|   | Bottom | 0.14 | −0.11 | 0.38 | 0.16 | −0.08 | −0.07 |

Looking from the internal side
+ve (positive) = Convexed
−ve (negative) = Concave

TABLE 4

Change in average bow during test (mm)

| Type of Bow | Door 1 - Longitudinal | Door 1 - Transverse | Door 2 - Longitudinal | Door 2 - Transverse |
|---|---|---|---|---|
| Initial bow | −0.310 | 0.240 | −1.455 | −0.090 |
| Bow after treatment | 2.295 | 0.445 | 1.725 | 0.475 |
| Overall Bow | 2.605 | 0.205 | 3.180 | 0.565 |
| Bow due to heating | 0.010 | −0.365 | 0.945 | 0.010 |
| Bow due to cooling | 2.595 | 0.570 | 1.875 | 0.555 |

TABLE 5

Bow due to heating with different temperature (mm)

| Temperature (° C.) | Door 1 - Hinge side | Door 1 - Lock side | Door 1 - Top | Door 1 - Bottom | Door 2 - Hinge side | Door 2 - Lock side | Door 2 - Top | Door 2 - Bottom |
|---|---|---|---|---|---|---|---|---|
| 40 | −0.520 | 0.540 | −0.350 | −0.380 | 1.870 | 0.200 | 0.050 | −0.030 |
| 50 | −0.750 | 0.470 | −0.350 | −0.330 | 1.910 | 0.360 | 0.080 | −0.010 |
| 60 | −0.240 | 0.200 | −0.130 | −0.090 | −0.210 | −0.130 | −0.080 | −0.170 |

Further tests were carried out on doors made in accordance with the invention and comprising:

Two vacuum formed PVC sheets of 1.5 mm thickness at 20° C.

A foam core supplied by Acell Doors

A Foaming PU adhesive

A laminated timber frame

The dimensions of the door at 20° C. were 2 m high×1 m wide.

In repeated tests, bowing of the order of less than 3 mm at 60° C. was noted. However, PVC door sheets are known to expand 1 mm over a 1 m length for each 10° C. increase in temperature. If it is assumed that "triangular" expansion occurs rather than parabolic, a PVC sheet 3 metres in length constrained at top and bottom would be expected to bow by approximately 89.5 mm, In a panel such as a door, the sheet is constrained at all four sides and a bow of the order of 90 mm would be expected.

Without wishing to be bound by any theory, it is known that PVC creeps as temperature increases. It is believed that in the arrangement of the present invention, where the skins are adhered to the foam core by a glue, preferably a polyurethane glue, creep occurs towards the centre of the door and thus a 40° C. rise in temperature would only increase the thickness by about 1% averaged over the whole cell.

For comparison, doors containing other foams (ie not open cell rigid foams) were subjected to the test and bowing of the order of 10 mm was noted. Thus the general structure offers an improvement over prior art doors but a particularly preferred door can be obtained by using filled phenolic foam and most particularly that produced by effecting a curing reaction between:

(a) a liquid phenolic resole having a reactivity number (as herein defined) of at least 1 and (b) a strong acid hardener for the resole, in the presence of.

(c) a finely divided inert and insoluble particulate solid which is present in an amount of at least 5% by weight of the liquid resole and is substantially uniformly dispersed through the mixture containing resole and hardener;

The temperature of the mixture containing resole and hardener due to applied heat not exceeding 85° C. and the said temperature and the concentration of the acid hardener being such that compounds generated as by-products of the curing reaction are volatilised within the mixture before the mixture sets whereby a foamed phenolic resin product is produced.

Again without wishing to be bound by any theory, the composite nature of the door, in particular its frangible open cell foam core, enables creep and recovery without destroying the bond between the skin and the foam core. Further, free venting through the open cells and orifices cut in the wood frame prevent a build up in pressure. This has been demonstrated by repeated cyclical test. In particular it is noted that bowing peaks at a temperature below 60° C. and then recovers as temperature-induced creep increases.

What is claimed is:

1. A panel comprising a substantially open-cell, rigid foam core and at least one vacuum formed thermoplastic skin adhesively bonded to said foam core, the panel is in the form of a door.

2. The panel of claim 1 characterised in that the panel comprises a laminate of said core adhesively bonded to and located between two vacuum formed thermoplastic skins.

3. The panel of claim 2 further including a frame or frame member.

4. The panel of claim 3 characterised in that said frame or frame member is wood.

5. The panel of claim 1 comprising at least one skin having depressed zones and wherein portions of the rigid foam core behind the depressed zones have been compressed with fracture of the cell walls of the foam to accommodate said zones.

6. The panel of claim 1 wherein said at least one skin comprises vinyl chloride polymer.

7. The panel of claim 6 wherein said vinyl chloride polymer comprises uPVC.

8. The panel of claim 1 wherein the foam core has at least one face containing pores which when the, or each, skin is in place are open to the rear face of the skin.

9. The panel of claim 1 wherein density of the foam is at least 75 kg/m$^3$.

10. The panel of claim 1 wherein the foam core has frangible cell walls and the yield strength of the foam is at least 100 Kpa.

11. The panel of claim 1 wherein the foam core is a rigid filled phenolic foam.

12. The panel of claim 1 wherein the foam core is produced by effecting a curing reaction between:

(a) a liquid phenolic resole having a reactivity number of at least 1 and (b) a strong acid hardener for the resole in the presence of:

(c) a finely divided inert and insoluble particulate solid which is present in an amount of at least 5% by weight of the resole and is substantially uniformly dispersed through the mixture containing resole and hardener;

the temperature of the mixture containing resole and hardener due to applied heat not exceeding 85° C. and the said temperature and the concentration of the acid hardener being such that compounds generated as by-products of the curing reaction are volatilised within the mixture before the mixture sets whereby a foamed phenolic resin product is produced.

13. The panel of claim 12 wherein said finely divided inert and insoluble particulate solid comprises a hydraulic cement.

14. A moulded panel comprising at least one thermoplastics skin having depressed zones adhesively bonded to a foamed plastics core wherein the core comprises a substantially rigid plastics foam having frangible cell walls and portions of the core behind the depressed zones have been compressed with fracture of the cell walls of the foam to accommodate said zones, the panel is in the form of a door.

15. The panel of claim 14 wherein the at least one skin is vacuum formed.

16. The panel of claim 14 wherein said at least one skin comprises vinyl chloride polymer.

17. The panel of claim 16 wherein said vinyl chloride polymer comprises uPVC.

18. The panel of claim 14 wherein the foam core has at least one face containing pores which when the, or each, skin is in place are open to the rear face of the skin.

19. The panel of claim 14 wherein density of the foam is at least 75 kg/m$^3$.

20. The panel of claim 14 wherein the rigid plastics foam has frangible cell walls and the yield strength of the foam is at least 100 Kpa.

21. The panel of claim 14 wherein the rigid plastics foam is a rigid filled phenolic foam.

22. The panel of claim 14 wherein the rigid plastics foam is produced by effecting a curing reaction between:

(a) a liquid phenolic resole having a reactivity number of at least 1 and (b) a strong acid hardener for the resole in the presence of:

(c) a finely divided inert and insoluble particulate solid which is present in an amount of at least 5% by weight of the resole and is substantially uniformly dispersed through the mixture containing resole and hardener;

the temperature of the mixture containing resole and hardener due to applied heat not exceeding 85° C. and the said temperature and the concentration of the acid hardener being such that compounds generated as by-products of the curing reaction are volatilised within the mixture before the mixture sets whereby a foamed phenolic resin product is produced.

23. The panel of claim 22 wherein said finely divided inert and insoluble particulate solid comprises a hydraulic cement.

24. A method of an open cell foam as a rigid core for a panel having at least one thermoplastics skin to improve the weather resistance of the panel, comprising the step of using the panel as a door.

25. The method of claim 24 wherein that at least one skin is a vacuum formed skin.

26. The method of claim 24 wherein the foram core has at least one face containing pores which when the, or each, skin is in place are open to the rear face of the skin.

27. The method of claim 24 wherein density of the foam is at least 75 kg/m³.

28. The method of claim 24 wherein the open cell foam has frangible cell walls and the yield strength of the foam is at least 100 KPa.

29. The method of claim 24 wherein the open cell foram is a rigid filled phenolic foam.

30. The panel of claim 24 wherein the open cell foam is produced by effecting a curing reaction between:
(a) a liquid phenolic resole having a reactivity number of at least 1 and
(b) a strong acid hardener for the resole in the presence of:
(c) a finely divided inert and insoluble particulate solid which is present in an amount of at least 5% by weight of the resole and is substantially uniformly dispersed through the mixture containing resole and hardener;

the temperature of the mixture containing resole and hardener due to applied heat not exceeding 85° C. and the said temperature and the concentration of the acid hardener being such that compounds generated as by-products of the curing reaction are volatilised within the mixture before the mixture sets whereby a foamed phenolic resin product is produced.

31. The panel of claim 30 wherein said finely divided inert and insoluble particulate solid comprises a hydraulic cement.

* * * * *